United States Patent [19]

Wright, Jr.

[11] Patent Number: 5,704,029

[45] Date of Patent: Dec. 30, 1997

[54] SYSTEM AND METHOD FOR COMPLETING AN ELECTRONIC FORM

[75] Inventor: Gerald V. Wright, Jr., San Diego, Calif.

[73] Assignee: Wright Strategies, Inc., La Jolla, Calif.

[21] Appl. No.: 247,777

[22] Filed: May 23, 1994

[51] Int. Cl.$^6$ .................................................. G06F 17/30
[52] U.S. Cl. ........................................................ 395/149
[58] Field of Search ..................................... 395/146, 148, 395/149

[56] References Cited

U.S. PATENT DOCUMENTS

| | | | |
|---|---|---|---|
| 4,603,232 | 7/1986 | Kurland et al. | 379/92 |
| 4,651,288 | 3/1987 | Zeising | 395/117 |
| 4,730,253 | 3/1988 | Gordon | 364/413.02 |
| 4,863,384 | 9/1989 | Slade | 434/107 |
| 4,937,439 | 6/1990 | Wanninger et al. | 235/456 |
| 5,047,960 | 9/1991 | Sloan | 395/149 |
| 5,100,329 | 3/1992 | Deesen et al. | 434/327 |
| 5,204,813 | 4/1993 | Samph et al. | 364/419.2 |
| 5,208,907 | 5/1993 | Shelton et al. | 395/149 |
| 5,225,996 | 7/1993 | Weber | 364/550 |
| 5,283,861 | 2/1994 | Dangler et al. | 395/149 |
| 5,335,164 | 8/1994 | Gough, Jr. et al. | 364/149 |

OTHER PUBLICATIONS

Straley, Straley's Programming with Clipper 5.0, 1991, pp. 166–169, 1015–1020, 1079–1107.
Goodman, Danny, "The Newton Shuffle," MacUser, pp. 183–184, Feb. 1994.
Thornton, J., et al. "Using Computers to survey property," Public Finance Account, Feb. 12, 1993 (abstract only).
Brochure entitled "Introducing the ETE Communicator", Ete, Inc., 1993.
Brochure entitled "Newton Software Titles, Starcore", Newton, 1993.
Brochure entitled "Form Factor, Business and Personal Data Collection for PDAs", Meta Pacific, 1993.
Apple Computer, Inc., The NewtonScript Programming Language, Alpha Draft 1.0, Jul. 1993.

*Primary Examiner*—Heather R. Herndon
*Assistant Examiner*—Anton W. Fetting
*Attorney, Agent, or Firm*—Knobbe, Martens, Olson & Bear

[57] ABSTRACT

A system and method for providing computerized forms completion and processing. A forms designer utilizes a forms creation module that includes a scripting feature to create an electronic form. The scripting feature provides flow of control statements and a variety of functions useful in forms, e.g., such as questionnaires. These functions include data validation, field navigation/control (e.g., skip), context sensitive help, data formatting, alert sounds and dialog boxes. The scripting feature ensures that skip patterns are followed correctly and that the form is completed accurately. The forms creation program generates a field description record for each field created by the forms designer. The set of field description records that define the electronic form is then transferred to a handheld computer, such as a personal digital assistant (PDA). A user of the form, such as a respondent to a survey, utilizes the PDA to respond to the statements or questions that are part of the form. A forms engine executing on the PDA interprets one field at a time and displays that field in the sequence designed by the forms designer. Each field includes a prompt portion, an answer box portion, and a control portion that are displayed together on the display screen of the PDA. After the form is completed, the response data is optionally transferred to another computer for further processing or reporting.

23 Claims, 16 Drawing Sheets

Microfiche Appendix Included
(1 Microfiche, 56 Pages)

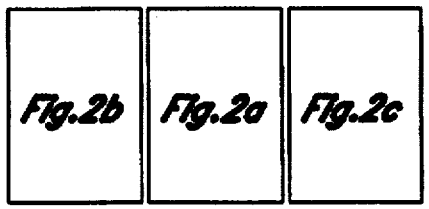

*Fig.2*

Joe's Diner          Customer Comment Card

Today's Date: ___/___/___

Number of people in your party: _____

Meal/s ordered: ○ Breakfast    ○ Lunch    ○ Dinner

If breakfast ordered, did you come for the $2.99 breakfast special?
○ Yes     ○ No Please rate the following:

| | Poor | | | | Excellent |
|---|---|---|---|---|---|
| Restaurant Cleanliness | ○ | ○ | ○ | ○ | ○ |
| Prompt Service | ○ | ○ | ○ | ○ | ○ |
| Courteousness | ○ | ○ | ○ | ○ | ○ |
| Food Appearance | ○ | ○ | ○ | ○ | ○ |
| Food Temperature | ○ | ○ | ○ | ○ | ○ |

Which two of the following would you like to see added to the menu?
○ More seafood entrees     ○ Vegetarian entrees
○ Larger selection of desserts     ○ Reduced calorie entrees
○ Imported beer

*Fig.2a*

```
                         ┌─148
                         │ Form     100
                         │ Field    4
                         │ Type     Multiple Response
                         │ Offset   [6]
                         │ Prompt   "Did you come for the $2.99 breakfast special?"
                         │ Answers  ["Yes,"No"]
                         │ Result   [1,2]
                         │ Help     "Please select 'Yes' or 'No'"
                         │ Script   NEXT
                         └─

┌─150
                         │ Form     100
                         │ Field    5
                         │ Type     Matrix
                         │ Offset   [7,8,9,10,11]
                         │ Prompt   "Please Rate the following:"
                         │ Answers  ["Restaurant Cleanliness", "Prompt Service",
                         │          "Courteousness", "Food Appearance", "Food
                         │          Temp."]
                         │ Range    ["Poor", "Excellent"]
                         │ Result   [1,2,3,4,5]
                         │ Script   NEXT
                         └─

┌─152
                         │ Form     100
                         │ Field    6
                         │ Type     Multiple Response
                         │ Offset   [12,13]
                         │ Prompt   "Which two of the following would you like to
                         │          see added to the menu?"
                         │ Answers  ["More seafood entrees", "Larger selection of
                         │          desserts", "Import Beer", "Vegetarian
                         │          entrees", "Reduced calorie entrees"]
                         │ Result   [1,2,3,4,5]
                         │ Next     EXIT
                         └─
```

*Fig.2c*

SYSTEM AND METHOD FOR COMPLETING AN ELECTRONIC FORM

MICROFICHE APPENDIX

A Microfiche Appendix containing computer source code is attached. The Microfiche Appendix comprises one (1) sheet of microfiche having 56 frames, including one title frame.

The Microfiche Appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to business forms and, more particularly, to systems for electronically creating and completing a business form.

2. Description of the Related Technology

For most people, completing a paper form is a bother. Frequently, many questions do not apply to the person or the situation, but the person completing the form must read all the items on the form to determine what is or is not applicable. To avoid the answering of irrelevant questions, the form may have instructions to skip one or more questions under certain conditions, which may cause confusion for the person filling out the form. Then, because there may be unanswered questions due to the skip instructions, the person completing the form may not be sure that all the necessary items or questions were properly answered.

One common type of form, known as a questionnaire, is used to complete a survey. For example, an amusement park operator may want to determine from survey information which rides are popular, why people came on that particular day, and so forth. There are basically two ways survey information is acquired in the field and then processed. The first, and perhaps oldest, method of recorded survey is simply to distribute copies of a paper form which are filled out by hand and, at a later time, entered into a computer by a typist. This is obviously an inefficient approach as data must be entered twice, once during the survey itself and again when the data is entered into the computer. It is also a process which allows two opportunities for error.

A more modern and widely used method utilizes Scantron/National Computer Systems (NCS) technology. This is the approach taken by most field survey data collectors today. In this situation the questionnaire is printed according to stringent technical specifications in a special form which is marked with a #2 pencil during the survey and then fed through a scanner utilizing Optical Mark Recognition (OMR)/Optical Character Recognition (OCR). An example of OMR is a Scantron/NCS scanning machine. The Scantron/NCS machine, hereafter referred to as the 'scanner', then compiles all survey results into a computer file for use in analysis. OCR scanners are also used. OCR forms are also specially printed, but can be written on with block letters.

The scanner approach can provide an order of magnitude increase in survey efficiency and accuracy. Since such forms no longer need to be manually entered into the computer, the significant accuracy loss associated with this process is also eliminated. The high cost of entering the data is also eliminated.

However, the scanner approach also has several serious limitations. First, the questionnaire forms are very expensive. Companies doing even a small number of surveys are incurring costs in the thousands on form duplication alone.

Second, although accuracy is generally enhanced, the opportunity for human error still exists during the survey itself. Many forms, especially questionnaires, contain complex sequences of jumps to other parts of the form in the questionnaire depending on information filled in. For instance, if a question asks for gender, the subsequent skip instruction could be "If you answered male to the previous question, go to question 10" and the answer to question 10 may also be the subject of a skip instruction. These instructions are collectively known as skip patterns. Often times survey takers will become lost trying to follow the skip pattern and will answer a question that should not be answered. The only time this mistake can be caught is in the scanning process. The scanner software can perform data validation checks to make sure the survey taker has not answered any questions he shouldn't have, or to check that the answer to a particular questions falls within a certain set of values. However, such post-survey validation takes time.

It takes time for someone to pull out a bad form, try to determine the error from a message on a computer screen, change the form, and re-scan it. Furthermore, it may be impossible to determine what the error was, and the form may thus have to be discarded. As a third limitation, creating new questionnaires is time consuming and expensive. Because the scanner forms must follow stringent technical specifications to be read by the scanner, expensive artwork is involved in creating a new form. To create a new survey, one must create the survey on paper, submit it to the scanner vendor, and pay around $800 for a two-sided 8½×14 form. Once it is created and thousands have been ordered, it is usually no longer economical or feasible to make any changes to the form itself.

Other ways of improving the completion of forms have been proposed. One such system is described in U.S. Pat. No. 4,937,439 to Wanninger, et al. ("Wanninger") wherein a desktop survey system for creating and scanning a survey form to be completed by a survey respondent is described. The survey forms are printed on a scannable form having a preprinted timing track which is scanned by an optical mark scanner. The system also includes a processor for entering and editing customized questions and corresponding response areas and for tabulating and analyzing the scanned results.

Other forms software packages are available for personal computers. The limitations of these forms packages include the following. Either the entire form is displayed on a monitor, or a section of the form is displayed at a time as the user scrolls the display to show the other pieces of the form. The latter situation is more common in a handheld computer environment, such as a personal digital assistant (PDA), because of the smaller screen size as compared to a PC monitor. In either case, the user's attention is not fixed on a single field of the form. To conserve space on a typical form created by a forms package, one or more levels of menus and/or dialog boxes must be selected. Thus, a discrete set of choices or answers are not shown on the form.

Another limitation based on the display of the entire form is that the order of completing the form cannot be controlled. A user may choose to fill in responses in an arbitrary order which may lead to incorrect results. A further limitation is the inability to easily and automatically backtrack through the completed sequence of items to correct a previous answer.

Thus a need exists for a system which (1) inexpensively creates new and modifies existing forms, (2) automatically handles skip patterns, (3) performs error validation as the form is filled out, (4) reduces error by limiting the presentation of information to a survey taker, and (5) is mobile.

SUMMARY OF THE INVENTION

The present solution to the problem of creating and accurately, quickly, and completely filling-in a business form is a computerized forms engine and system designed to automate and simplify the process. The goal of the forms system is to accurately and easily gather information and present it for further processing in a known format, or to even electronically send the gathered information to a desired party.

For example, a company may use an electronic form version of a product registration card. When the end user completes or fills out the registration form, the forms engine verifies the form information and then electronically forwards the information to the company in a format desired and recognized by the computer of the company. Thus, no paper forms are needed, the mail system is not needed, people to sort the mail at the company are not needed, and people to enter the form information into the company computer are not needed. These benefits all lead to savings in resources, overhead and money.

In the presently preferred embodiment of the invention, a personal computer (PC) program (e.g., running on a Apple Macintosh, or IBM compatible) creates a set of field structures representing the electronic form. The data representing the electronic form is sent from the PC to a portable computerized device, such as a Personal Digital Assistant (PDA) that has a graphics display. The electronic form is completed by a user of the PDA, and then the forms engine verifies the input data or information. The PDA sends a form data array containing the responses by the user to the computer. The first item in the form data array is a form identification so that the computer can identify the form that the data is associated with.

The forms engine presents a single item or question to the person, using as much of the display screen as is needed. Then, based on user-defined script contained in the form, the forms engine presents the next item or question to the person or beeps or displays a message. When a person answers a question and desires to move to the next field, the forms engine 124 executes a script written by the form designer. Although the most expected and common result of the script will be to advance to another question, it may also perform other actions such as beep and display a message, quit, or launch another form. This continues until all the pertinent questions have been answered, and only the questions applicable to the person or situation will be asked. Each question corresponds to a certain location on a hard copy version of the electronic form.

One aspect of the present invention includes, in an automated forms system including a portable computer, a method of displaying a response driven sentence, comprising the steps of providing an electronic form comprising a plurality of form descriptors, wherein each form descriptor defines a displayable item; displaying only one of the displayable items on a graphics display of the computer, wherein the displayable item includes a sentence and a plurality of possible responses, and wherein the one displayable item utilizes the entire display; and receiving one or more response entries to the displayable item selected by a user of the computer.

Another aspect of the present invention includes, in an automated forms system including a portable computer, a method of completing an electronic form comprising a plurality of form descriptors that define displayable items, comprising the steps of displaying only one of the displayable items on a graphics display of the computer, wherein the displayable item includes a sentence and a plurality of possible responses; receiving one or more response entries to the displayable item selected by a user of the computer; storing the response in the computer; branching to a subsequent displayable item in response to the selected response; and displaying the subsequent displayable item, wherein the subsequent item includes a plurality of possible response entries, on the display of the computer.

Yet another aspect of the present invention includes, in an automated forms system including a portable computer, a method of completing an electronic form, comprising a plurality of form descriptors that define displayable items, comprising the steps of displaying only one of the displayable items on a graphics display of the computer at any one time, wherein the displayable item includes a sentence and a plurality of possible responses; receiving one or more user selected response entries to the displayable item; storing the response in the computer; and validating the response according to a criteria.

Still yet another aspect of the present invention includes, in an automated forms system including a portable computer, a method of completing an electronic form, comprising a plurality of form descriptors that define displayable items, comprising the steps of displaying only one of the displayable items on a graphics display of the computer, wherein the displayable item includes a sentence and a plurality of possible responses, and wherein the one displayable item utilizes the entire display; receiving one or more response entries to the displayable item selected by a user of the computer; storing the responses in the computer; and automatically sending the responses to a remote computer via a communications device.

Yet another aspect of the present invention includes, in an automated forms system including a portable computer, a method of completing an electronic form, comprising the steps of providing the electronic form comprising a form descriptor that defines a displayable item; and displaying the one displayable item on a graphics display of the computer, wherein the screen displays a button and a number, and wherein the number is changed when the button is selected by a user of the computer.

Yet another aspect of the present invention includes a system for completing an electronic form, comprising a portable unit including a processor, a graphics display, an input device mechanism and a memory; an electronic form stored in the memory of the unit comprising a plurality of form descriptors that define displayable items; a forms engine to display a single displayable item on the graphics display described by one of the form descriptors, wherein the displayable item includes a sentence and a set of possible response entries, and wherein the one displayable item utilizes the entire display; and wherein the input device mechanism accepts one or more of the responses selected by a user of the unit.

Another aspect of the present invention includes a system for completing an electronic form, comprising means for processing and storing data; means connected to the processing means for displaying graphics; means for defining an electronic form including a plurality of displayable items; means for displaying a single one of the displayable items on the graphic means, wherein the displayable item includes a sentence and a set of possible response entries, and wherein the one displayable item utilizes the entire graphic means; and input means connected to the processing means for accepting one or more of the responses selected by a user of the system.

Still yet another aspect of the present invention includes, in a forms system including a computer and a portable computer, a method of automated forms completion, comprising the steps of generating an electronic form using the computer; sending data defining the electronic form from the computer to the portable computer; completing the electronic form, so that response data is generated and stored in the portable computer; and sending the response data from the portable computer to the computer.

Another aspect of the present invention includes, in an automated forms system including a portable computer, a method of completing an electronic form comprising a plurality of form descriptors, each form descriptor defining a displayable item, the system comprising the steps of displaying a selected one of the displayable items on a graphics display of the computer, wherein the displayable item includes a sentence and a plurality of possible responses, and wherein only the one displayable item is visible at any one time; receiving one or more user selected response entries to the selected displayable item; and providing a script stored in the form descriptor defining the selected displayable item, wherein the script defines a set of one or more actions to be executed.

DETAILED DESCRIPTION OF THE PREFERRED EMBODIMENT

The following detailed description of the preferred embodiments presents a description of certain specific embodiments to assist in understanding the claims. However, the present invention can be embodied in a multitude of different ways as defined and covered by the claims.

For convenience, the following description is topicalized into the following principal sections: Introduction, System Overview, Forms Creation, Forms Engine, Drawing Fields, Answer Box Input, Execute Script, Benefits of the Forms System, Optional System Configuration, and Summary of Advantages of the Present Invention.

I. INTRODUCTION

The present invention utilizes electronic forms to gather information. Electronic forms are easier to complete and can be validated as they are being completed. Paper forms do not have to be printed and stored. Revisions are easily made to an electronic form, thus eliminating the cost associated with a new printing of a paper form.

Figure 1:
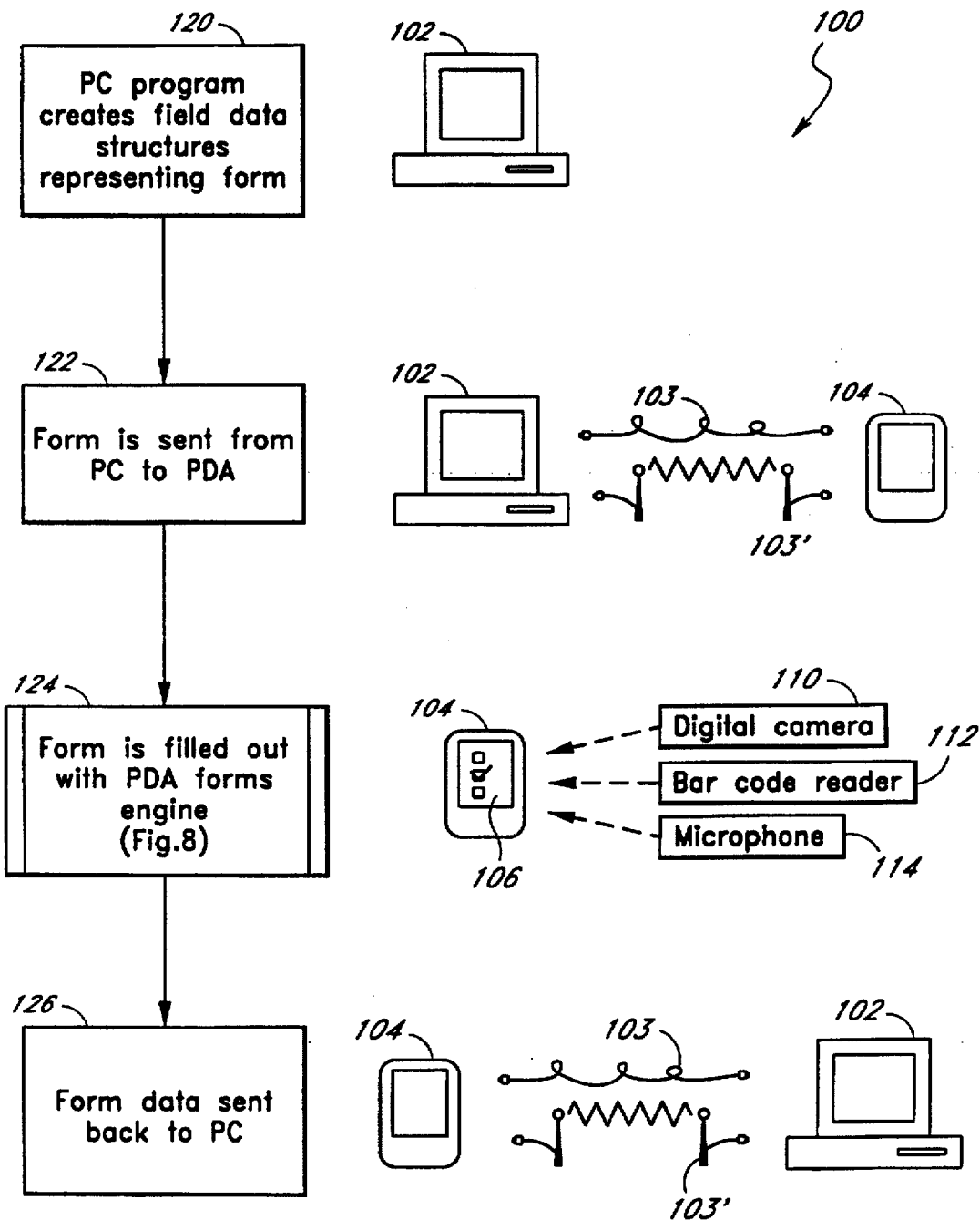
FIG. 1 is a high-level diagram illustrating the basic steps and components of a presently preferred embodiment of the forms system of the present invention.

The system of the present invention is typically used in either a forms creation and forms completion mode, or in just the forms completion mode, if the electronic form already exists. Referring to FIG. 1 showing a presently preferred embodiment, if a new form is necessary, or if a previous form needs to be revised or customized, a forms creator or forms designer creates the new form (state 120) by use of a forms creation program that runs on an Apple Macintosh or a Microsoft Windows based Personal Computer (PC). The forms creation program is considered to be a module of the forms system. After the form (not shown) is built, form descriptors or field description records, which define each of the form's fields, are transferred at a state 122 to a portable computer 104, which is henceforth referred to as a personal digital assistant (PDA), such as the Newton, available from Apple Computer, Inc. Newton is a trademark of Apple Computer, Inc. In the instance of the portable computer being characterized as a handheld computer, such as a Newton, the handheld does not have a keyboard and does not have a hinged display (i.e., a hinged display is not integrated with the processor section of the computer). The Newton does include a non-volatile, semiconductor random-access memory (RAM) subsystem. The RAM subsystem includes 640 Kb of static RAM and a 3 volt lithium backup battery. In the presently preferred embodiment, the battery has a lifetime in average use of approximately one year. Non-volatility refers to the ability of a memory to retain data when the main power for the computer is turned off. Thus, the static RAM in conjunction with the backup battery provide a non-volatile RAM subsystem. In another embodiment, data may be stored in non-volatile flash memory.

In a presently preferred embodiment, the transfer at state 122 is accomplished by connecting a serial cable 103 between the computer 102 and the PDA 104. Alternatively, other communication devices 103', such as modems or wireless technology, may be used for communication between the PDA 104 and computer 102.

Once one or more electronic forms are created and transferred to the PDA 104, a particular form to be completed is selected by, for example, a data collector (interviewer). The forms creator designs the form and a user of the form, e.g., the interviewer, are separate entities. A paper representation of the form is not used or needed. A forms engine (discussed below with respect to FIG. 8) displays one question or statement (and if appropriate, a corresponding set of possible answers or responses) at a time on the display screen 106 of the PDA 104 at a function 124. Note that the forms system can be operated in a portion of the display, which, for example, is commonly implemented as a window.

When the user (not shown) answers each question, thereby providing response data, the forms engine executes a script program for that question that may perform data validation, sound an alarm, display a message, quit, launch another form, skip to another question, and so forth. The script allows the forms designer to go to another question based on the previous answer(s). Thus, complex skip patterns may be utilized without burdening the user about which question is next, what questions are to be left blank or skipped, and so forth. Selections can be made by use of a stylus, such as a pencil, by a finger of the user, or other ways to identify a choice to the PDA 104.

Optional peripheral input devices which may be connected to the PDA 104 include a digital camera 110 to capture images, a barcode reader 112, and a microphone 114 for converting sound into an electrical signal. One or more of these external peripherals may be utilized to provide user input during the course of completing a form.

After the user completes a particular form, the collected data, stored in a form data array, is saved in the PDA 104. The response data may optionally be sent to a host computer 102 at state 126, which may be different than that used to create the form, for further processing. Various communication methods can be utilized to send the data to the host computer 102, e.g., a modem.

Thus, the forms system 100 can be used to create "smart" forms which automatically guide a user through the form. The respondent need only be concerned with answering each question on the screen 106 of the PDA 104 and the rest is taken care of by the forms engine.

II. SYSTEM OVERVIEW

Referring to FIG. 1, the components of a presently preferred embodiment of the computerized forms system 100 of the present invention are shown. The personal computer (PC) 102 may be an IBM compatible PC running Microsoft Windows version 3.1 or higher. To run Windows 3.1, the PC preferably includes an 80386 class processor with at least 4 Megabytes (Mb) of memory and an 80 Mb hard drive. A keyboard, a pointing device, such as a mouse or trackball, or other such input devices are connected to the computer for input and control. An alternate computer is an Apple Macintosh running Apple Operating System level 7.0 or higher. To run System 7.0, the processor is preferably a 68030 class or better. The memory, hard storage and input devices are similar to those for the PC. Of course, other similar computers with appropriate software and capability may be utilized.

The preferred Newton PDA operates under Newton Intelligence version 1.05 or higher operating system. The forms engine software is written in Newton Script programming language using the Newton beta-level tool kit, and is compiled by the Newton tool kit. The Newton Script Programming Language manual (Alpha Draft 1.0) is hereby incorporated by reference. The forms creation software is written in OMNIS 7 version 1.3 and compiled using OMNIS 7. Source code for the form engine software is included in the attached Microfiche Appendix. Of course, other handheld computers and programming languages may be used.

III. FORMS CREATION

The object the forms system 100 works with, or its document type, is the form. Forms may be created, edited, duplicated, and sent. Visually, forms appear on the screen of the PC 102 as a window made up of a list of fields. Within the current form, users may add new fields, edit fields, or remove fields.

A. Form Creation Operations

The forms creation program used to design a new electronic form includes several menus: a "File" menu, a "Connect" menu, and a "Design" menu. Each menu lists a plurality of options representing operations performed in the creation of a form. The forms designer selects from among the options to initiate a desired operation. The options germane to the creation of the form are now briefly discussed below.

Available from "File" menu unless otherwise designated.

New Form

Dialog box prompts user for form name and description. A form number is automatically assigned. A form window is displayed with an empty field list.

Open Form

Dialog box prompts user for form to open from list of existing forms. After selection is made, a window opens containing a form field list.

Duplicate Form

Dialog box prompts user for form to duplicate from a list of existing forms. After selection is made, a new form is created with name "Duplicate of 'Previous Name'". A new form number is also assigned. This allows the user to create a derivative form without reentering all form information from another form.

Remove Form

Dialog box prompts user for the form to remove. The program removes it after the selection is made and confirmed.

Send Form (Available from "Connect" menu)

Dialog box prompts user for form to send. After the form is selected, program goes into a wait state until the PDA 104 is connected. Once the PDA 104 is connected, form is sent as series of field description records. If the PDA 104 is not connected, a keystroke sequence allows the wait state to be terminated.

The following are Field Operations (Available from "Design" menu).

New Field

The user is prompted with a dialog box from which the desired field type is selected. In the presently preferred embodiment, this list includes multiple response, multiple dichotomy, matrix, text, number. In another embodiment, counter types are utilized. After a selection is made, an appropriate editor window allows the field to be created. There are specific editors for use with each type of field. Each editor is designed to gather appropriate information for the respective field type in a user-friendly manner.

Edit Field

The selected field is displayed with the appropriate field editor.

Remove Field

The selected field or fields are removed if the user accepts a confirmation message.

he following is a Program Function (Available from "Connect" menu).

Receive Data

The receive data function puts the program in a wait state. Multiple PDAs may be connected, and all form information is downloaded by program. When the user has finished with all PDAs, a keystroke sequence is entered that will end the wait state. At this point all form data received is sorted by form number and saved in individual files by form.

B. Steps in Creating Example Form

Forms are created as a series of numbered fields which are navigated by field scripts. Field types include common survey response structures, as well as text and numeric fields for open ended entry. The execution of the form is driven by field scripts written in a scripting language supporting flow of control statements such as IF/THEN/ELSE, and over 100 functions. Scripts can provide common survey functions such as data validation, field navigation, context sensitive help, data formatting, alert sounds, and dialog boxes. Scripts can ensure that skip patterns are always followed correctly, and that forms are always filled out accurately. In another embodiment, skip or sequence control statements, such as Next and Goto may be utilized by the forms engine outside of the script, i.e., sequence control statements do not have to be part of the script. Other embodiments may not even use scripts.

Thus, the scripting feature of the forms system 100 further improves survey accuracy and reliability. Scripts also allow the form designer or forms creator to find bottlenecks in questionnaires by determining how much time the user takes to answer a particular field, or to trigger other PDA applications from inside the form.

Figure 2B:
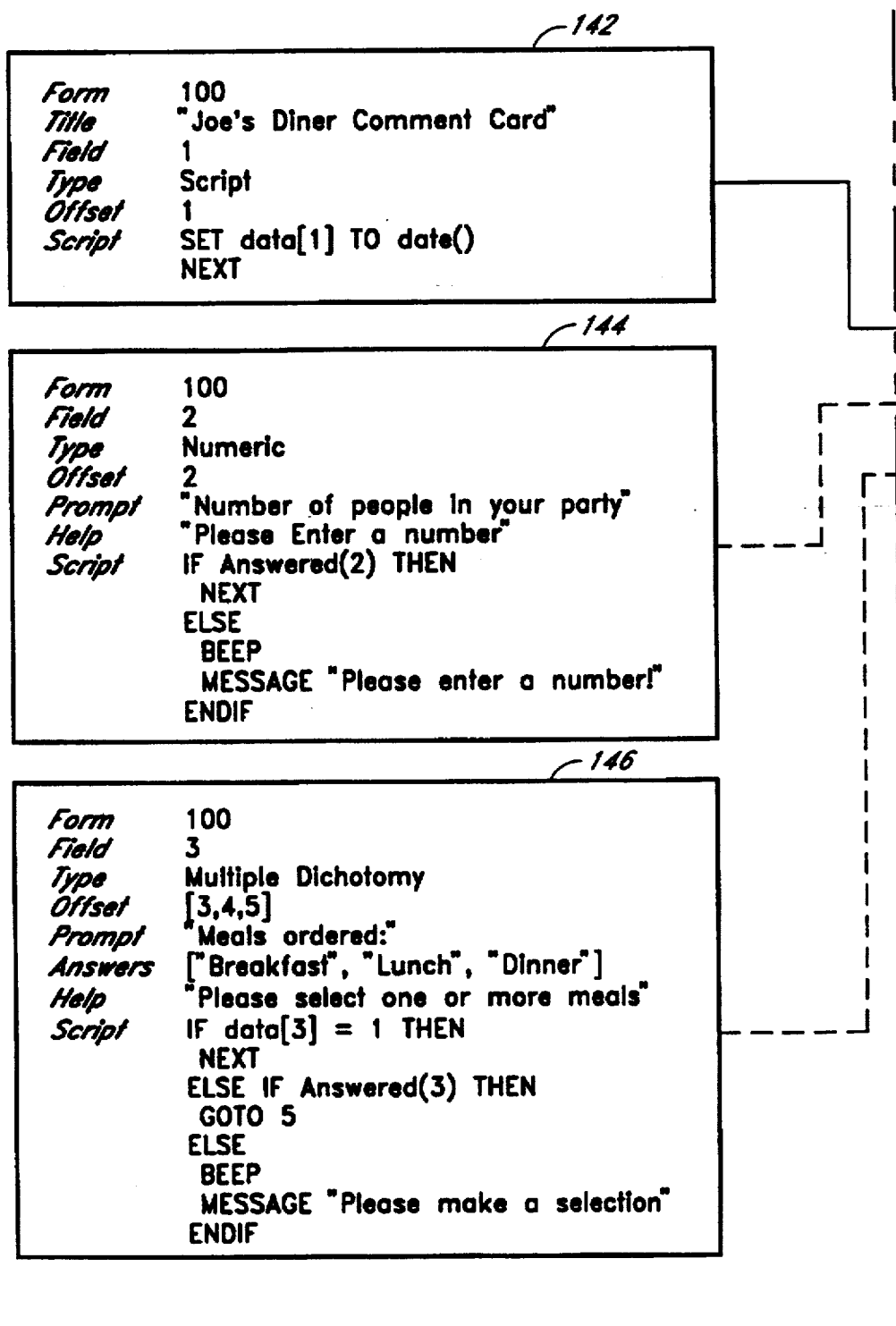
FIG. 2 (comprising FIG. 2a, 2b and 2c) is exemplary field data structure printed form and a set of exemplary field data structures for the form as used in the system of FIG. 1.

Referring now to, FIGS. 2a, 2b and 2c the field description records or form descriptors generated by the steps below are illustrated in a composite diagram. The comment card 140 (FIG. 2a) is a diagrammatic paper representation shown as a composite of the individual display screens for each field of the form. At this juncture, it must be emphasized that the form as a whole is not displayed (as illustrated in FIG. 2a) on the graphics display of the PDA 104 (FIG. 1). The steps or instructions for creating an example form, a "Customer Comment Card" for Joe's Diner, are as follows. (FIGS. 3-7 show details of fields 2-6. Field 1 is not shown in detail because it is not a displayable field, i.e., a screen display is not generated for this field.)

1. Create and Name the Form

Select New . . . from the File menu and enter a name for the form and a brief description. Click OK to bring up an empty form window.

2. Create Field 1

Select New Field . . . from the Design menu to create a new field. When prompted for field type, select Script, then click OK. Because the first field in the form always holds the current date, the form fills this field in automatically using a script type field. In the field editor that is brought into use by the forms creation program, some attributes have already been filled in: number and offset. The field editor is used by the forms designer to edit an individual field description record.

Referring now to a record 142 (FIG. 2b), the number in a field attribute or field uniquely identifies the field description record (FDR) (and the field defined by the FDR), and the offset field indicates a position in the resulting data stream, i.e., the form data array, that will be used by the script. In this case, offset 1 is used to store the date. The text in a text edit box is changed by the forms creator to the following:

| 1) | SET data[1] TO date( ) |
| 2) | NEXT |

The first line of this script uses the set command to put the date in offset 1. The second line uses the NEXT statement to move on to the next field in the form. The forms creator clicks the OK button to accept the changes made to this field. The result is example field description record (FDR) 142.

3. Create Field 2—Number of people in your party

Referring now to FDR 144 (FIG. 2b), select New Field . . . from the Design menu to create a new field. When prompted for field type, select Numeric. This field requires more attributes than the script field. The question number and offset have been entered automatically. First enter the desired text in the form of a question or statement. In this example, the text, "Number of people in your party", is entered in the prompt box. Next, the forms creator writes a field script that will be evaluated when the user taps the next field button. In this case, the forms engine continues on to field 3 if the user fills in this field, or beeps and displays a message if the field is empty. The forms creator then changes the default script "NEXT" to the following:

| 1) | IF Answered(2) THEN |
| 2) | NEXT |
| 3) | ELSE |
| 4) | BEEP |
| 5) | MESSAGE "Please enter a number!" |
| 6) | ENDIF |

Figure 8:
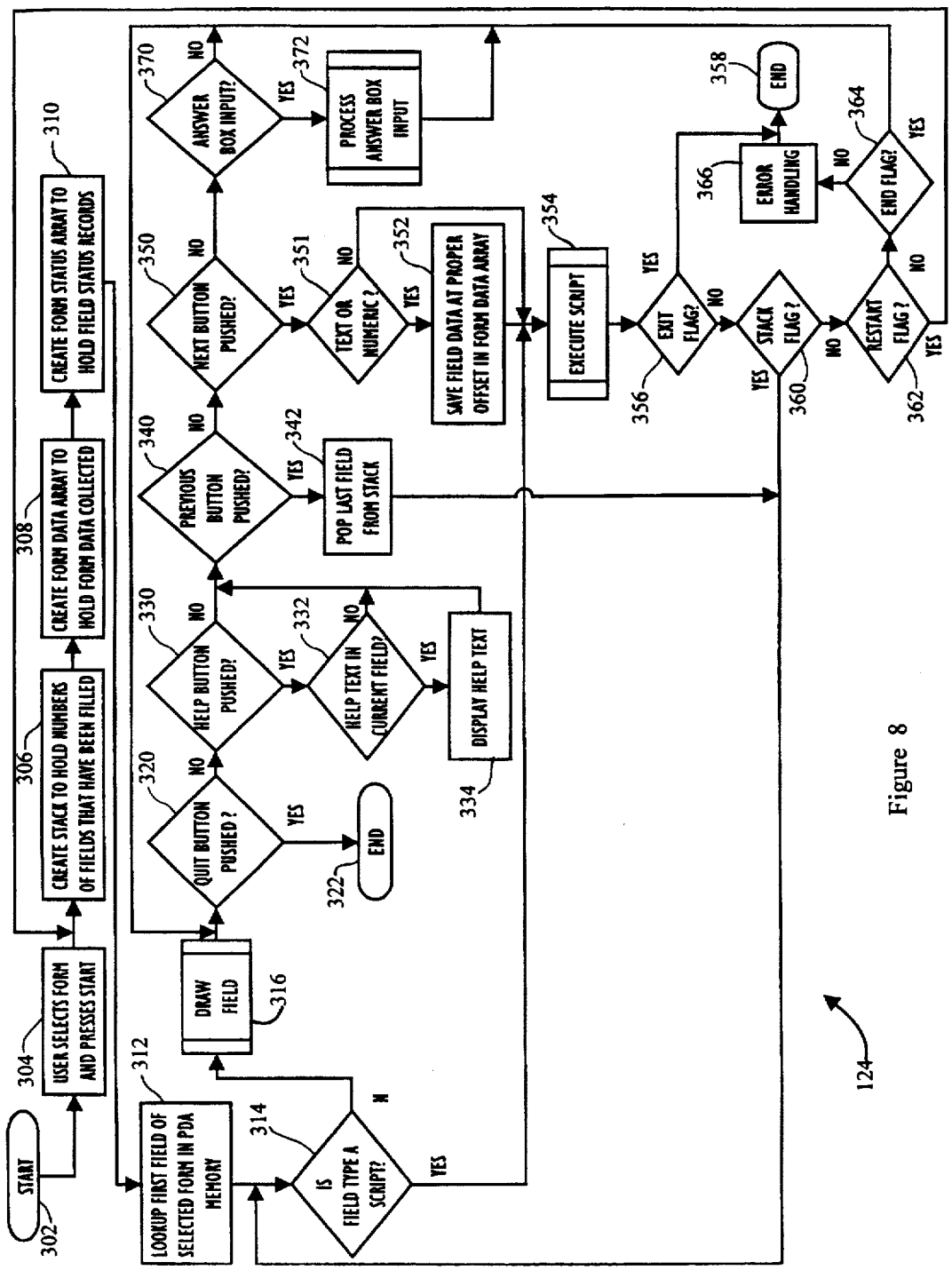
FIG. 8 is a top-level flow diagram of the form engine process performed while the form is filled out by the "Form is filled out with PDA" step of FIG. 1.

This script uses an IF/THEN/ELSE statement to do two different things depending on a certain condition, that is, whether or not field 2 has been answered. If it has been answered, line 2 of the script uses the NEXT statement to advance the user to the next field. However, if field 2 has not been answered, line 4 of the script initiates sounding a beep with the BEEP statement and line 5 uses the MESSAGE statement to display a dialog box with the text "Please enter a number!". Note that the script does not wait for the user to provide an answer as part of the script, but rather, after the script is performed, the forms engine waits and checks for the user to either press a button or provide answer box input during the forms engine function 124 (FIG. 8).

If the forms designer would like to provide the user with help, i.e., a message activated with the help button, the help message is entered in the entry box marked Help Message. The forms designer clicks OK to accept and save the changes made to this field. The result is example field description record 144. An example screen display 162 shown in FIG. 3 corresponds with the FDR 144.

4. Create Field 3—Meal/s Ordered

Referring now to FDR 146 (FIG. 2b), select New Field . . . from the Design menu to create a new field. When prompted for field type, select Multiple Dichotomy. This field is a little different, in that its results take up more than one position in the form data array. In fact, this type requires one position, or offset, in the form data array for each of the possible selections. The data will contain a 1 (one) at the appropriate offset if the item is selected, and will remain blank otherwise.

First, the forms creator enters the text, "Meal/s Orderd", in the entry box marked prompt. Next, the forms creator clicks Add . . . below the list box labeled Answer Choices, enters "Breakfast" in the dialog, and clicks Add. "Lunch" and "Dinner" are entered in the same way. When all answer choices have been entered, click Done. As the answers are entered, the offsets 3,4, and 5 are inserted automatically by the forms creation program. The forms creator now writes a script that will control the sequence of the electronic form when the user taps the next button. In this example, if the user has selected "Breakfast", the form asks if he came for the $2.99 special, otherwise the form requests the user to rate some aspects of the restaurant. If the user doesn't select any answer, the forms engine will sound a beep and display a message asking the user to make a selection.

The forms creator enters in the following script to exhibit this behavior:

| | |
|---|---|
| 1) | IF data[3] = 1 THEN |
| 2) | NEXT |
| 3) | ELSE IF Answered(3) THEN |
| 4) | GOTO 5 |
| 5) | ELSE |
| 6) | BEEP |
| 7) | MESSAGE "Please make a selection" |
| 8) | ENDIF |

The IF/THEN/ELSE statement is used to take different actions depending on certain conditions. The first line of the script checks to see if "Breakfast" has been selected by checking whether offset 3 contains a 1 (one). If it does, line 2 of the script uses the NEXT statement to continue with the next field in order, i.e., field 4. If offset 3 does not contain a 1 (one), line 3 of the script is evaluated. Line 3 checks to see if the other choices, "Lunch" and "Dinner", were chosen in field 3 by using the Answered( ) function. The argument of the Answered( ) function is a field number and returns a true or false result. If the user has selected at least one response or provided an answer for the field identified in the Answered( ) function argument, the function returns as true. If no answer has been provided by the user, the function returns false. If one of the other choices has been selected, line 4 uses the GOTO statement to skip to field 5 (FDR 150). Otherwise lines 6 and 7 of the script initiate sounding a beep and display the message "Please make a selection".

If the forms designer would like to provide the user with help, the help message is entered in the entry box marked Help Message. The forms designer clicks OK to accept and save the changes made to this field. The result is example field description record 146. An example screen display 166 shown in FIG. 4 corresponds with the FDR 146. An associated field status record 168 provides information used in the display of the selected answer(s).

5. Create Field 4—"If breakfast ordered, did you come for the $2.99 breakfast special?"

Referring now to FDR 148 (FIG. 2c), select New Field . . . from the Design menu to create a new field. When prompted for field type, select Multiple Response. This field type is similar to Multiple Dichotomy in that the forms creator can list multiple answers for the user to choose from, but different in the respect that the number of answers that a user can select simultaneously can be limited. The results from this field occupy as many offsets in the form data array as there are simultaneous responses allowed. If the forms creator limits the user to only two responses, only two offsets are used to store the results of the user's selections.

To create the field, the forms creator first enters the question text in the prompt entry box. Next, the number of responses allowed is entered, which in this case is 1 (one). (The form user can select "Yes" or "No", but not both.) The offset 4 is automatically inserted in the offset list by the forms creation program. The forms creator must also enter result values for each of the answer choices available. These will be the values placed at the appropriate offsets for the answer choice selected. For example, the forms creator can choose the value 1 (one) for "Yes" and the value 2 (two) for "No". This will cause a 1 (one) to be placed at offset 4 when the user selects "Yes" and a 2 (two) to be placed at offset 4 when the user selects "No". To enter these answers and result values, the forms creator clicks on the Add button below the list box, and in the dialog box, enters the answers and the respective result values. The forms creator clicks Done when finished.

In this example, because the forms designer doesn't care if the user leaves this field unanswered, the script doesn't need to do anything complicated. It only needs to take the user to the next field. Therefore, no changes need to be made to the default script, "NEXT".

If the forms designer would like to provide the user with help, the help message is entered in the entry box marked Help Message. The forms designer clicks OK to accept and save the changes made to this field. The result is example field description record 148. An example screen display 176 shown in FIG. 5 corresponds with the FDR 148. An associated field status record 178 provides information used in display of the selected answer.

6. Create Field 5—"Please rate the following:"

Referring now to FDR 150 (FIG. 2c), select New Field . . . from the Design menu to create a new field. When prompted for field type, select Matrix. The matrix type allows the forms designer to create several rows of buttons from which the user can select only one button per row. The matrix field editor is more complex than some of the others. First, the forms designer fills in the Prompt entry box with the prompt: "Please rate the following." Next, the forms designer fills in the item labels and their corresponding offsets, the column labels, and the result values. To add items to any of these lists, the forms designer clicks on the list, then clicks the Add button. The forms designer enters the matrix row labels in the first list box starting with "Restaurant Cleanliness" and ending with "Food Temperature". As these items are entered, the next available offsets, 7 through 11, are automatically inserted by the forms creation program. Next, the forms designer inserts the matrix column labels. In this example, there are only two: "Poor" and "Excellent". Column labels will always appear equally spaced across the top of the matrix. Next, the forms designer enters the result values. The number of result values entered determines the number of bubbles there are for each row. The result values themselves will be inserted in the form data array at the offset for each item. In this example, the forms designer uses a scale of 1 to 5. The numbers 1 through 5 are added by clicking on the Result Value list and then clicking the Add button.

Again, because the forms designer does not require a response for this field, the default script, "NEXT" is used, as in the previous field (field 4).

If the forms designer would like to provide the user with help, the help message is entered in the entry box marked Help Message. The forms designer clicks OK to accept and save the changes made to this field. The result is example field description record 150. An example screen display 184 shown in FIG. 6 corresponds with the FDR 150. An associated field status record 186 provides information used in display of the selected answer(s).

7. Create Field 6—"Which two of the following would you like to see added to the menu?"

Referring now to FDR 152 (FIG. 2c), select New Field . . . from the Design menu to create a new field. When prompted for field type, select Multiple Response. This is the same type of field used in the Yes/No field above (field 4), but now, more than one response is allowed. In the Prompt entry box, the forms designer enters the text: "Which two of the following would you like to see added to the menu?". Next, the forms designer enters "2" for the number of responses allowed. The next two available offsets, 12 and 13, are automatically inserted in the offset list by the forms creation program. These offsets are the locations in the form data array where the two selections will be stored. Next, the forms designer clicks on the Add button below the Answer Choices list box to enter the answer choices ("More Seafood entrees" through "Reduced calorie entrees") and their corresponding result values (1 through 5).

The script for this field is very simple. The forms designer replaces the default "NEXT" script with "EXIT" to cause the form to end after this field has been completed.

If the forms designer would like to provide the user with help, the help message is entered in the entry box marked Help Message. The forms designer clicks OK to accept and save the changes made to this field. The result is example field description record 152. An example screen display 192 shown in FIG. 7 corresponds with the FDR 152. An associated field status record 194 provides information used in display of the selected answer.

8. Send Form to the PDA

Select Send Form ... from the Connect menu. If the form window is still open, a status window will appear waiting for the forms designer to connect the PDA 104. If the forms designer has closed the form window, he/she will be prompted for a form to send, and then the status window appears. The forms designer connects the PDA 104 with a serial cable, taps on the envelope icon, and then taps Connect on the pop-up item. The form is then sent to the PDA 104 and the status window closes. As an alternative, a modem or other communications device can be used in place of the serial cable to transfer the form. The communications device may use wireless technology.

IV. THE FORMS ENGINE

Once an electronic form is loaded in the PDA 104 (FIG. 1), a data collector or interviewer in a survey or questionnaire type of application, can choose to fill out any of a number of forms which have been previously loaded. The number of forms that can be loaded depends on the amount of random-access memory (RAM) (not shown) in the PDA 104. Current PDA devices can generally store large numbers of reasonably small forms in the standard RAM.

Users complete or fill out a form during execution of the forms engine function 124. Once form execution begins, the interviewer has very little to do when compared to the paper based process. Because the scripts, running under the forms engine, control form execution, the user doesn't need to follow any complex skip patterns or even worry about answering a question incorrectly. Aside from answering the current question, he/she can select one of four functions by tapping on buttons (FIG. 3): go to the NEXT field 220, go to PREVIOUS field 222, get HELP 224, or QUIT 226. When the NEXT button 220 is pressed, the field script is executed. At this point, the PDA 104 running the script may check to see that the field was answered correctly and if so, go to the next appropriate field. If not, the script may cause the PDA 104 to beep and display a help message, or perform some other action. The forms engine 124 tracks the progress as the user progresses through the form. At any point while completing the form, the user may tap the PREVIOUS button 222 to go back to change an answer to a previous question. Also, the user may tap the HELP button 224 at any time for instructions for the current field.

When an electronic form has been completed, the form data stored in the PDA 104 can be sent back to the PC 102 via serial cable, modem, or other communications devices. Once transferred, the form data can be automatically cleared from the PDA memory. In the presently preferred embodiment, the form data is then sorted by form and saved to disk, preferably in a tab-delimited format, where it is available for use with spreadsheets, databases, tabulation packages, and other programs. In another embodiment, other formats for the form data are utilized.

Referring now to FIG. 8, the forms engine function 124 located in the PDA 104 (FIG. 1) will now be described. Beginning at a start state 302, the forms engine 124 moves to a state 304 wherein the user selects the electronic form to be completed and presses a start button displayed on the screen 106 of the PDA 104. Moving to state 306, the forms engine 124 creates a stack to hold the numbers of the fields already answered in the order they were answered thus providing a mechanism to maintain a history of the answered fields. A stack is a well known data structure in the programming technology.

Proceeding to state 308, the forms engine 124 creates a form data array to hold the form data collected as each field is completed. The data array is indexed by the offset number provided in the field description record (FDR). For example, the field description record 148 (FIG. 2c) for field number 4 uses offset 6 to hold the answer for that field, while FDR 150 for field number 5 uses offsets 7-11 to hold the multiple answers for that field. At some time after the form is completed, the data array is transmitted from the PDA 104 to the computer 102 as a data stream.

Advancing to state 310, the forms engine 124 creates a form status array to hold a field status record for each field type that requires it. In the presently preferred embodiment, the field types that require the field status record are the multiple dichotomy, multiple response, and matrix. The field status record is created and used by the forms engine 124 to track which answers or responses are selected by the user and is used to draw the field. Referring to the example of FIG. 4, field status record 168 includes an answerState 170. The answerState essentially indicates which box, button, or bubble of a plurality of boxes, buttons or bubbles is selected. The answerState is a one-dimensional array having as many elements as the number of offsets defined in the corresponding FDR. Three offsets are indicated by the FDR 146, so the answerState will be a three element array. Thus, since only the first and second of three boxes are checked in the example of FIG. 4, the answerState is [1,1,NIL]. The field status record will be further described in conjunction with the draw field function 316 (FIG. 9) and answer box input function 372 (FIG. 10).

Moving to state 312, the forms engine 124 accesses the first field (field number 1) of the selected electronic form in the PDA memory. In the example form presented in FIG. 2, field 1 referenced by numeral 142 is accessed. Proceeding to a decision state 314, forms engine 124 determines if the type field of the current field is "script". The example field 1 (142) is of type "script". If the field type is script, the forms engine advances to an "execute script" function 354 that executes the script developed by the forms designer for the current field. In general, if the type field is script, the script initiates a calculation or an action to be performed by the PDA 104. The execute script function 354 will be further described in conjunction with FIG. 11.

If the field type is not script, as determined at state 314, the forms engine 124 moves to a "draw field" function 316 that generates a screen display for the current field being processed. In the example field drawn on the screen display 162 shown in FIG. 3, the user of the form is required to respond to a sentence in a prompt box portion 163 of the screen display 162 by making a selection or writing an answer in an answer box portion 164. The draw field function 316 will be further described in conjunction with FIG. 9.

Moving to decision states 320, 330, 340, 350 and 370, the forms engine 124 determines if one of buttons 220 to 226 (FIG. 3) in the control portion of the screen display 162 has been selected, or if the user is making a selection or writing an answer in the answer box portion 164. The control portion of the screen display 162 comprises functions under forms engine control, i.e., buttons 220 through 226 and scroll arrows 228, 230.

At decision state 320, the forms engine 124 determines if the quit button 226 has been selected. If the quit button has been selected, the forms engine proceeds to an end state 322 to terminate the forms engine process. If the quit button was not selected, as determined at state 320, the forms engine 124 advances to a decision state 330 to determine if the help button 224 has been selected. If so, the forms engine 124 moves to a decision state 332 to determine if the current field has associated "help text" in the help field of the FDR. If so, the forms engine 124 proceeds to state 334 and displays the help text on the screen 106 of the PDA 104. If the forms designer did not utilize "help text" for the current field, as determined at state 332, or after the help text has been displayed and dismissed, the forms engine 124 continues on to a decision state 340.

If the help button 224 (FIG. 3) was not selected, as determined at state 330, the forms engine 124 advances to decision state 340 to determine if the "previous" button 222 has been selected. If so, the forms engine 124 moves to state 342 and pops the last field number that was entered on the stack (created at state 306). The FDR corresponding to the field number popped from the stack is then accessed, and the forms engine 124 loops back to decision state 314 to process the field.

If the previous button 222 (FIG. 3) was not selected, as determined at state 340, the forms engine 124 advances to a decision state 350 to determine if the "Next" button 220 has been selected. If so, the forms engine 124 moves to a decision state 351 to determine if the current field is a text or numeric field type. If not, the forms engine 124 skips state 352 because the other field types insert their data into the form data array when the user makes selections in the answer box. If the current field type was determined at state 351 to be either text or numeric, the forms engine 124 moves to state 352 and saves the response(s) or answer(s), i.e., the resultant field data, provided by the user in the answer box portion 164 into the form data array (created at state 308) at the offset(s) identified for the current field. Each field of the electronic form that requires a response from the user of the form has one or more associated offsets, as defined in the FDR, into the form data array. After the field data is saved at state 352 or if the field type is other than text or numeric, as determined at state 351, the forms engine 124 proceeds to the "execute script" function 354. Function 354 performs the step(s) of the script for the current field which may include validating the response(s) of the user and determining the next field to be processed. Function 354 will be further described hereinbelow.

Upon return from the execute script function 354 (FIG. 11), the forms engine 124 checks the status of several flags or indicators that may be set during execution of the script file during function 354. The condition of the flags is communicated to the forms engine 124. Moving to a decision state 356, the forms engine 124 determines if an "exit" flag was set as a result of performing an exit statement during function 354. If so, the forms engine proceeds to an end state 358 which signifies that the form has been completed.

If the exit flag is not set, as determined at state 356, the forms engine 124 proceeds to a decision state 360 to determine if a "stack" flag is set. If so, the forms engine 124 loops back to state 314 to determine the field type of the new field addressed and accessed at either state 732 (due to a NEXT statement) or state 742 (due to a GOTO statement) during execution of function 354.

If the stack flag is not set, as determined at state 360, the forms engine 124 proceeds to a decision state 362 to determine if a "restart" flag was set as a result of performing a RESTART statement during function 354. If so, the forms engine 124 loops back to state 306 to begin processing the currently selected form from the beginning. During RESTART of execute script 354, the form data array is saved in PDA non-volatile static RAM at a state 752 before returning to the forms engine 124.

If the restart flag is not set, as determined at state 362, the forms engine 124 proceeds to a decision state 364 to determine if an "end" flag was set. The end flag is set due to reaching the end of script during function 354. If so, the forms engine 124 loops back to decision state 320 to check for additional input or action by the user. If the end flag is not set, as determined at state 364, the forms engine 124 proceeds to state 366 to perform any error handling necessary, for example, due to an error flag set during execution of the forms engine 124 or any called functions, such as array indices out of bounds, division by zero or other error conditions. Upon completion of error handling at state 366, the forms engine proceeds to the end state 358.

If the Next button 220 (FIG. 3) was not selected, as determined at state 350, the forms engine 124 advances to a decision state 370 to determine if the user has made changes to the answer box 164 portion of the display (FIG. 3) response(s). If so, the forms engine 124 moves to a "process answer box input" function 372. Function 372 initiates drawing the selections or input made by the user in the answer box portion 164 of the screen display 162 (FIG. 3) while completing the current field and performs validation, e.g., makes sure input falls within the constraints of the field. The form data array and, if necessary, the field status record are also updated during the answer box input function 372. Function 372 will be further described in conjunction with FIG. 10. Upon return from function 372 or if decision state 370 proves to be false (no answer box input), the forms engine 124 loops back to decision state 320 to wait for user input or selection of one of the buttons 220–226 (FIG. 3) in the control portion of the screen display 162. In the current preferred embodiment, the PDA 104 shuts itself off after a user defined period of inactivity. When turned back on, the user continues where he or she was previously.

Table 1 shows an example stack for the example Customer Comment Card shown in FIGS. 2–7, while Table 2 shows an example form data array. Both the stack and the array are shown when the form is completed by the user. The values shown in the stack and form data array correspond with the user selections indicated in the example FIGS. 3–7.

TABLE 1

Field Order Stack

| | |
|---|---|
| | |
| | |
| | |
| 6 | ←←← Top of Stack |
| 5 | |
| 4 | |
| 3 | |
| 2 | |

TABLE 2

Form Data Array

| Offset | 1 | 2 | 3 | 4 | 5 | 6 | 7 | 8 | 9 | 10 | 11 | 12 | 13 |
|---|---|---|---|---|---|---|---|---|---|---|---|---|---|
| Value | 5/13/94 | 3 | 1 | 1 | | 2 | 1 | 3 | 2 | | 5 | 1 | 3 |

V. DRAWING FIELDS

Figure 9A:
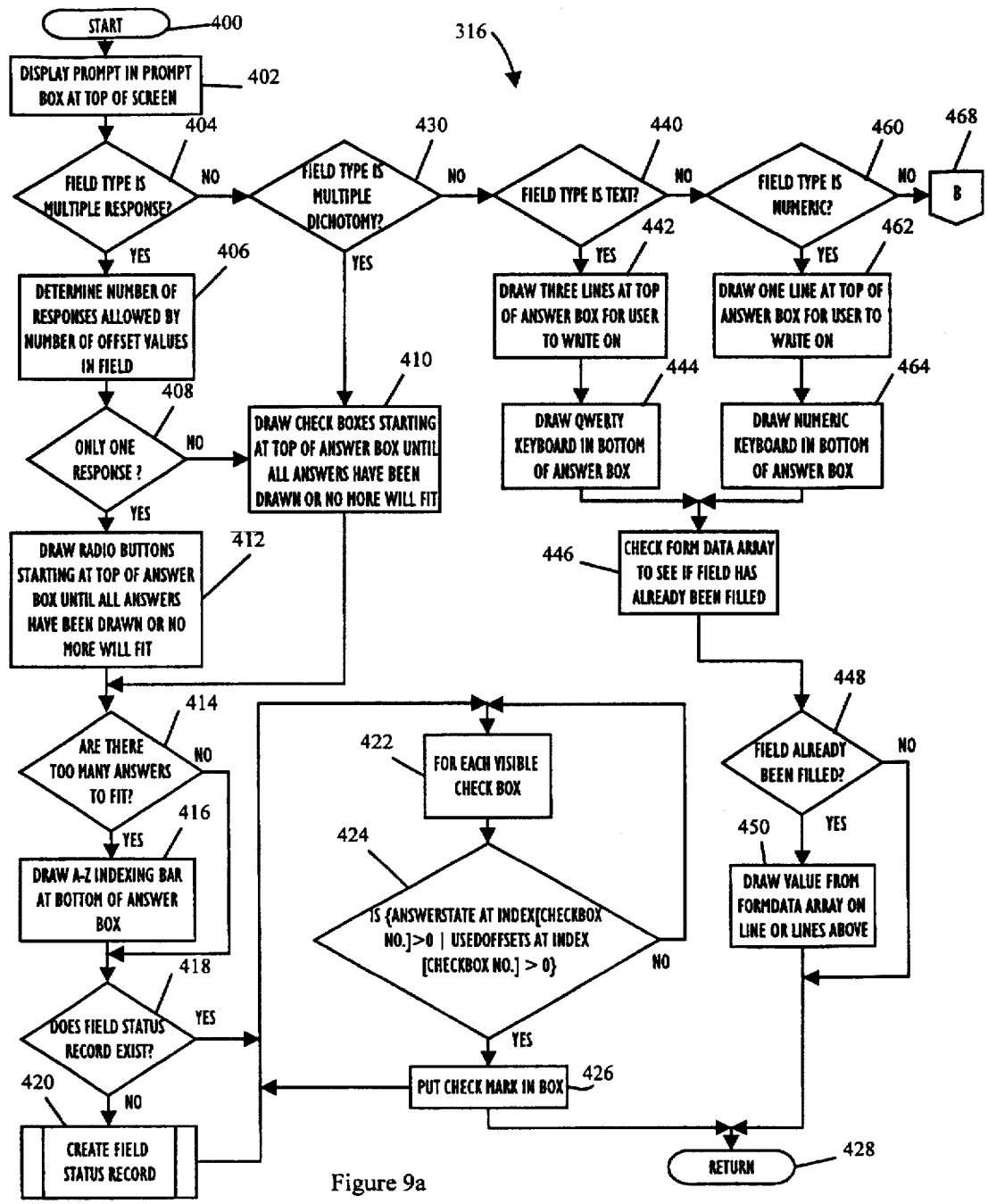
FIGS. 9a and 9b are a flow diagram of the "draw field" function 316 presented in FIG. 8.
Figure 9B:
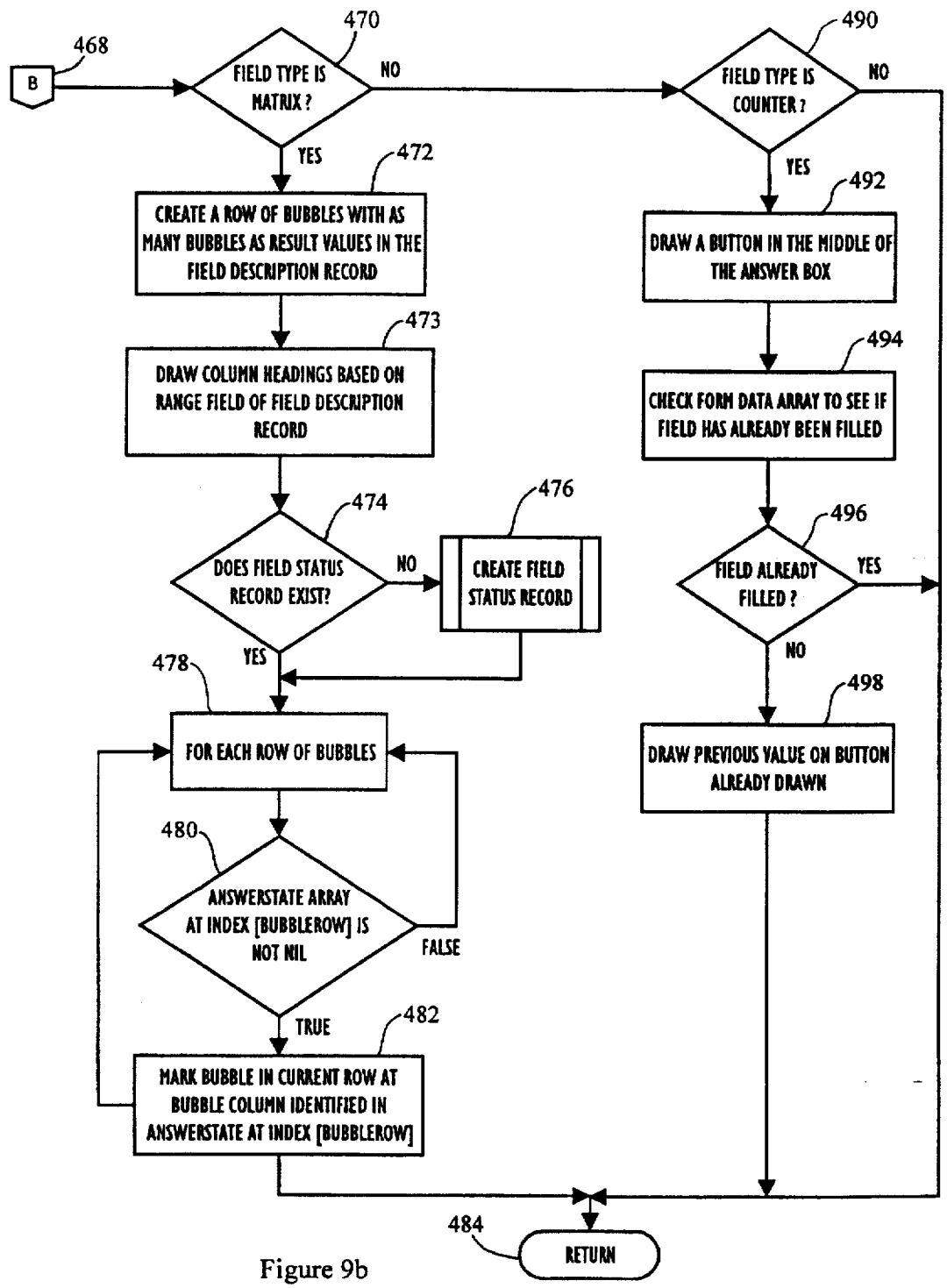

Referring now to FIGS. 9a and 9b, the "draw field" function 316 will be described. The draw field function 316 draws the screen display for the current field being processed. As previously mentioned, the user of the form is required to respond to a "sentence" in a prompt box portion (as shown by the example field illustrated in FIG. 3) of the screen display 162 by making a selection or writing an answer in an answer box portion 164. The sentence in the prompt box portion can be a statement, a command, a question or other similar construct, and may be an incomplete sentence, e.g., a phrase.

Figure 3:
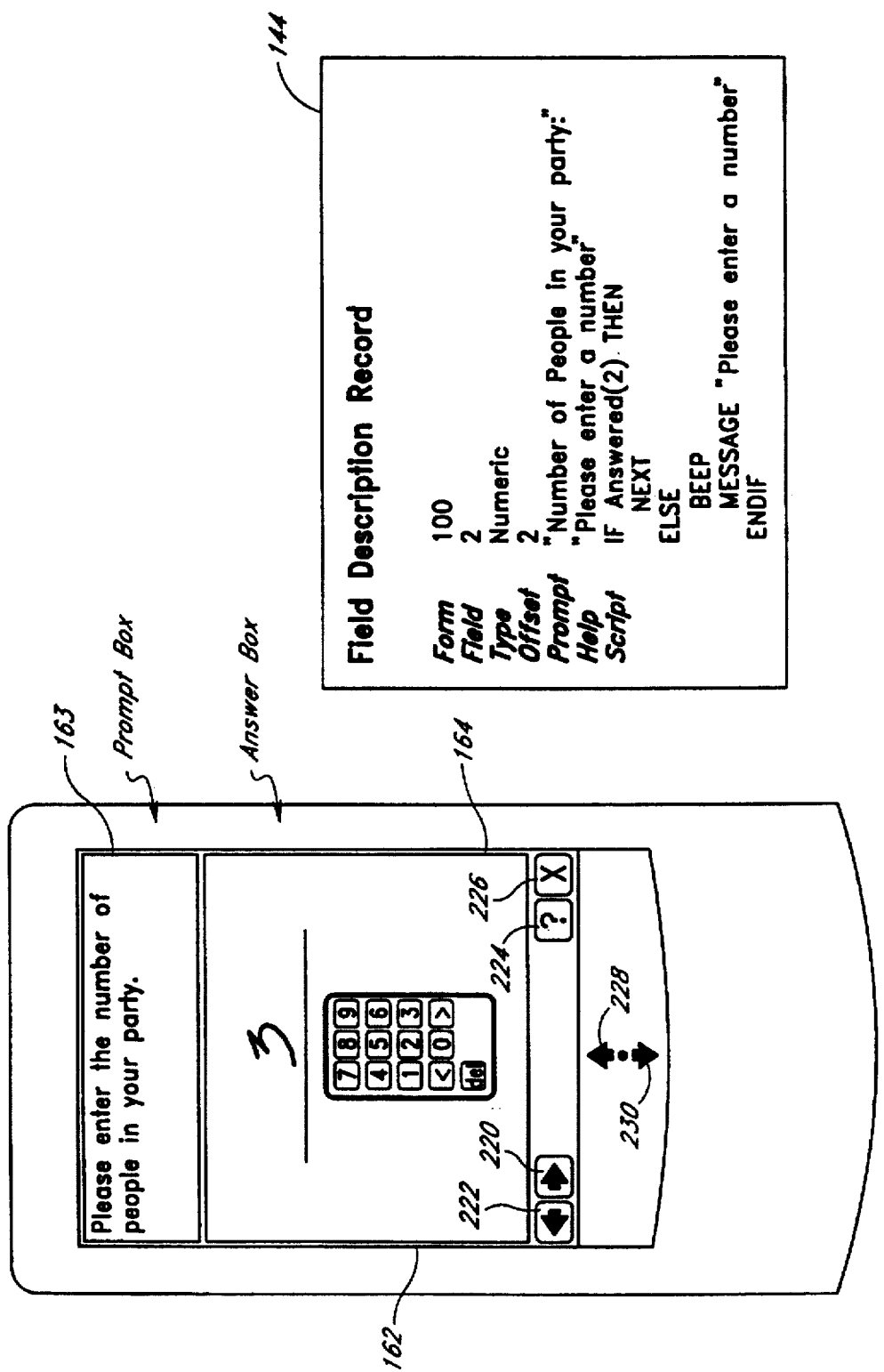
FIG. 3 is a diagram of an exemplary screen display as presented on the display of the handheld computer for the field 2 data structure and the associated field description record of the exemplary form of FIG. 2.

Beginning at a start state 400, the forms engine 124 moves to state 402 and displays the prompt from the prompt field of the current field description record (FDR) in the prompt box portion 163 at the top of the screen display 162 (FIG. 3). Proceeding to a decision state 404, the forms engine determines if the field type of the current FDR is "multiple response". If so, the forms engine 124 advances to a decision state 406 to determine the number of responses allowed for the current field by examining the number of offsets defined in the current FDR. For example, field 4 referenced by numeral 148 (FIG. 2c) defines one offset (thus allowing one response), while field 6 referenced by numeral 152 defines two offsets (thus permitting two responses). Moving to a decision state 408, if more than one response is allowed for the current field, the forms engine 124 moves to state 410 and draws check boxes and assorted answers from the answers array of the FDR, beginning at the top of the answer box 164 (FIG. 7) until either all answers have been drawn or no more answers will fit on the display screen 106 of the PDA 104. Check boxes and the process of drawing them are well known in the field of graphics technology, e.g., Visual Basic available from Microsoft Corp. uses and draws checkboxes.

If the current FDR only defines one response, i.e., one offset, as determined at state 408, the forms engine proceeds to state 412 and draws radio buttons and associated answer text from the answer array of the FDR beginning at the top of the answer box 164 (FIG. 5) until either all answers have been drawn or no more answers will fit on the display screen of the PDA 104. Radio buttons are round option buttons used for making a selection, such that only one radio button can be selected within a group of radio buttons at one time. At the completion of state 410 (drawing check boxes) or state 412 (drawing radio buttons), the forms engine 124 moves to a decision state 414 to determine if there are too many possible answers or responses to fit on the screen 106 of the PDA at one time. If so, the forms engine proceeds to state 416 and draws an "A to Z indexing bar" at the bottom of the answer box so the user can navigate the remaining answers onto the display screen of the PDA. The answers are arranged in alphabetic order to facilitate use of the indexing bar. Alternatively, scroll arrows 228, 230 (FIG. 3) can be used to scroll into view the additional answers (one screenful at a time) into the answer box.

If all the answers fit on one display screen of the PDA, as determined at state 414, or after the indexing bar is drawn at state 416, the forms engine proceeds to a decision state 418 to determine if a field status record exists for the current field. If not, the forms engine proceeds to a create field status record function 420 to generate a record for the current field. In the presently preferred embodiment, several field types utilize a field status record, namely multiple response, multiple dichotomy and matrix. Several fields may be utilized within a field status record depending on the field type defined in the current FDR. The matrix field type and the multiple dichotomy field type use an answerState field and the multiple response field type uses a usedOffsets/ answerState and two additional fields, described below, if more than one offset is defined in the FDR.

As previously mentioned, the field status record is created and used by the forms engine 124 to record which answers or responses are selected by the user. Referring to the example screen and records of FIG. 7 (for a multiple response field type with multiple offsets), field status record 194 includes an usedOffsets/answerState field 202. The usedOffsets field 202 indicates which offsets, of the offsets defined in the corresponding FDR, are used. The usedOffsets field 202 utilizes an "n" by one array, where "n" is the number of check boxes in the field, to indicate which offset corresponds to each checked box. The array 202 essentially indicates which box or button of a plurality of response boxes or buttons is selected. The array 202 is a single element if only one response is allowed, but has as many elements as checkboxes if multiple responses are allowed. All the array elements are initially set to NIL. The array 202 indicates the position of selected checkboxes, wherein the first element of the array corresponds to the first checkbox in the list of checkboxes and so forth. When a checkbox is selected by the user, the first offset number from an availOffsets array of the field status record is used to overwrite the contents of the usedOffsets array corresponding to the selected checkbox.

Figure 7:
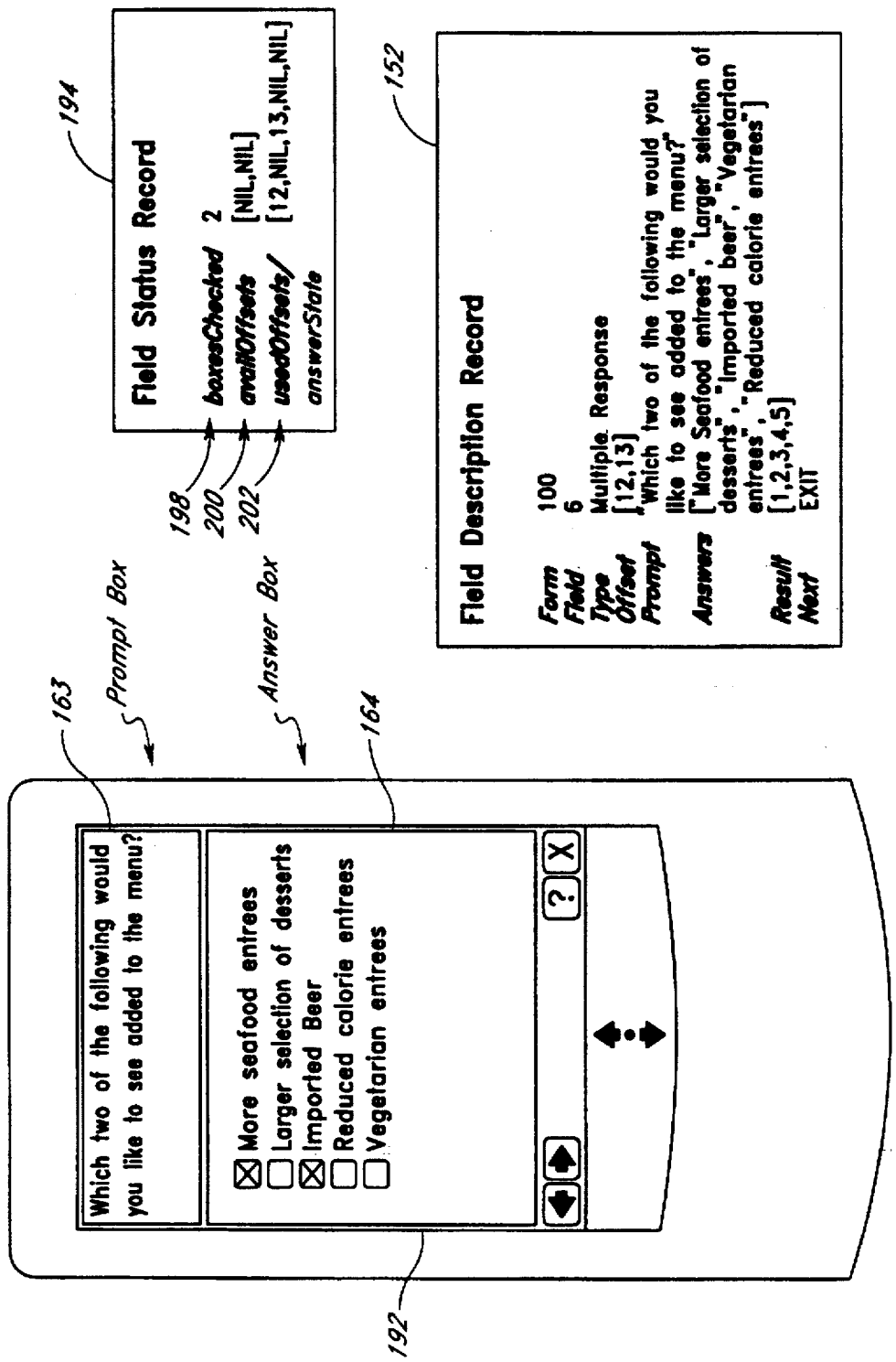
FIG. 7 is a diagram of an exemplary screen display as presented on the display of the handheld computer for the field 6 data structure, and the associated field description record and a field status record of the exemplary form of FIG. 2.

In the example of FIG. 7, offsets 12 and 13 are defined in the FDR and two boxes are checked on the display at the first and third positions (beginning at the top of the answer list, with the first position selected first. The usedOffsets field is indicated by [12,NIL, 13,NIL,NIL] in this example, where NIL indicates that the position is not used.

Because more than one offset is defined in the corresponding FDR for this multiple response field, two additional fields are utilized in the field status record: boxesChecked 198, availOffsets 200. The value of the BoxesChecked field 198 indicates how many check boxes are currently checked.

In the example of FIG. 7, two boxes are checked (as seen in answer box portion 164). The availOffsets field 200 indicates which offsets, of the offsets defined in the corresponding FDR, are yet unused. Initially, the offsets from the offset field of the current FDR are copied into the availOffsets array. In the example of FIG. 7, since two offsets are defined in the FDR and two boxes are already checked, there are no available offsets which is indicated by [NIL, NIL].

At the completion of creating the field status record for the current field at function 420 or if the record was determined to exist at decision state 418, the forms engine 124 proceeds to a loop of states 422, 424, 426 to fill in any check marks for the displayed field. At state 422, for each check box visible in the answer box portion 164 of the display screen, the forms engine 124 determines at a decision state 424 if a check mark is to be placed in the check box at state 426. At decision state 424, the forms engine uses the answerState array, if multiple dichotomy is the current field type, or usedOffsets array, if multiple response is the current field type, of the field status record to determine if the position indexed by the check box number currently evaluated contains a value greater than zero. If so, a check mark is drawn in the check box at state 426. If not, the forms engine loops back to state 422 to evaluate the next visible check box. The loop 422–426 continues until all visible check boxes have been evaluated, at which time the forms engine 124 moves to state 428 and returns to the forms engine function (FIG. 8).

Figure 4:
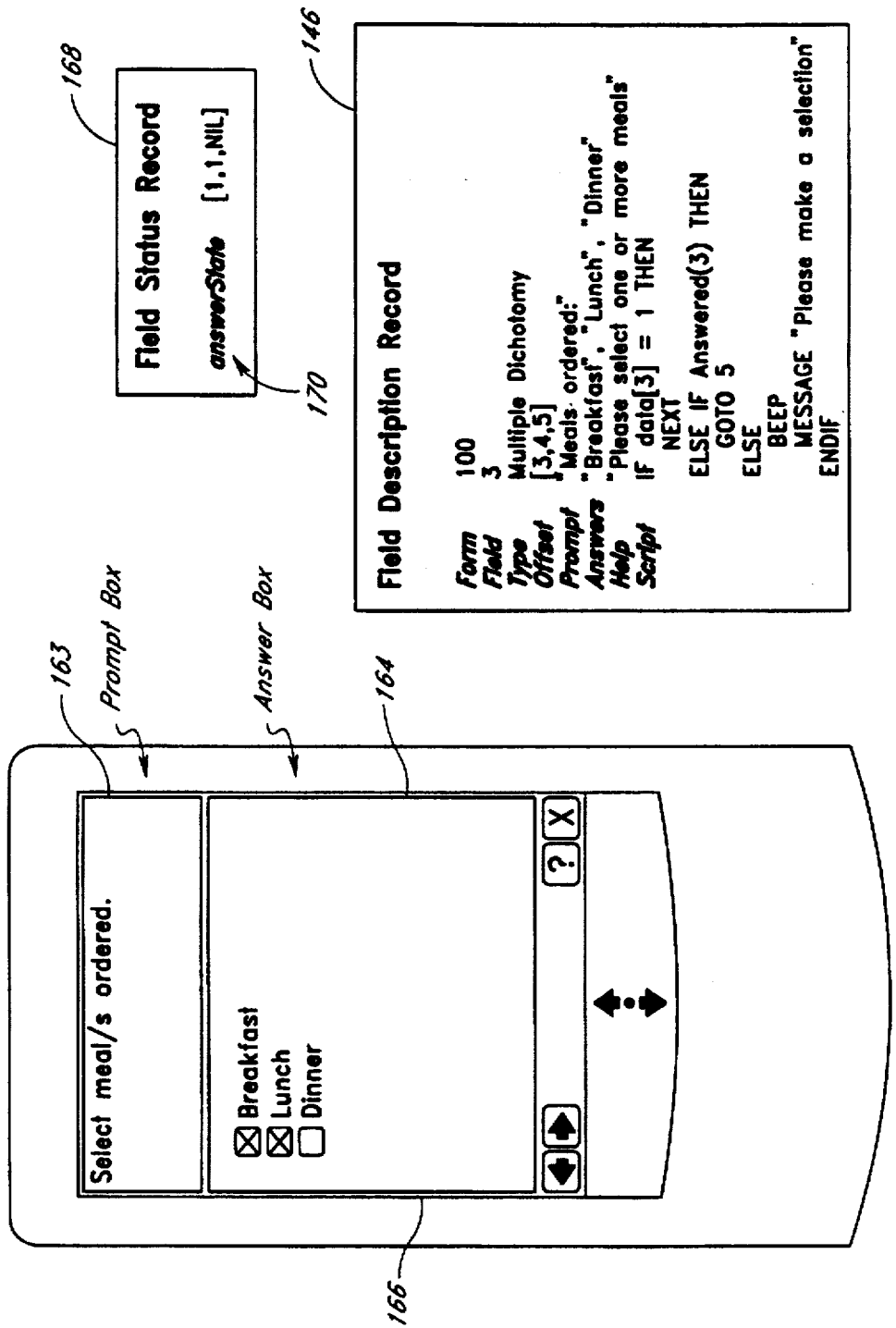
FIG. 4 is a diagram of an exemplary screen display as presented on the display of the handheld computer for the field 3 data structure, and the associated field description record and a field status record of the exemplary form of FIG. 2.
Figure 5:
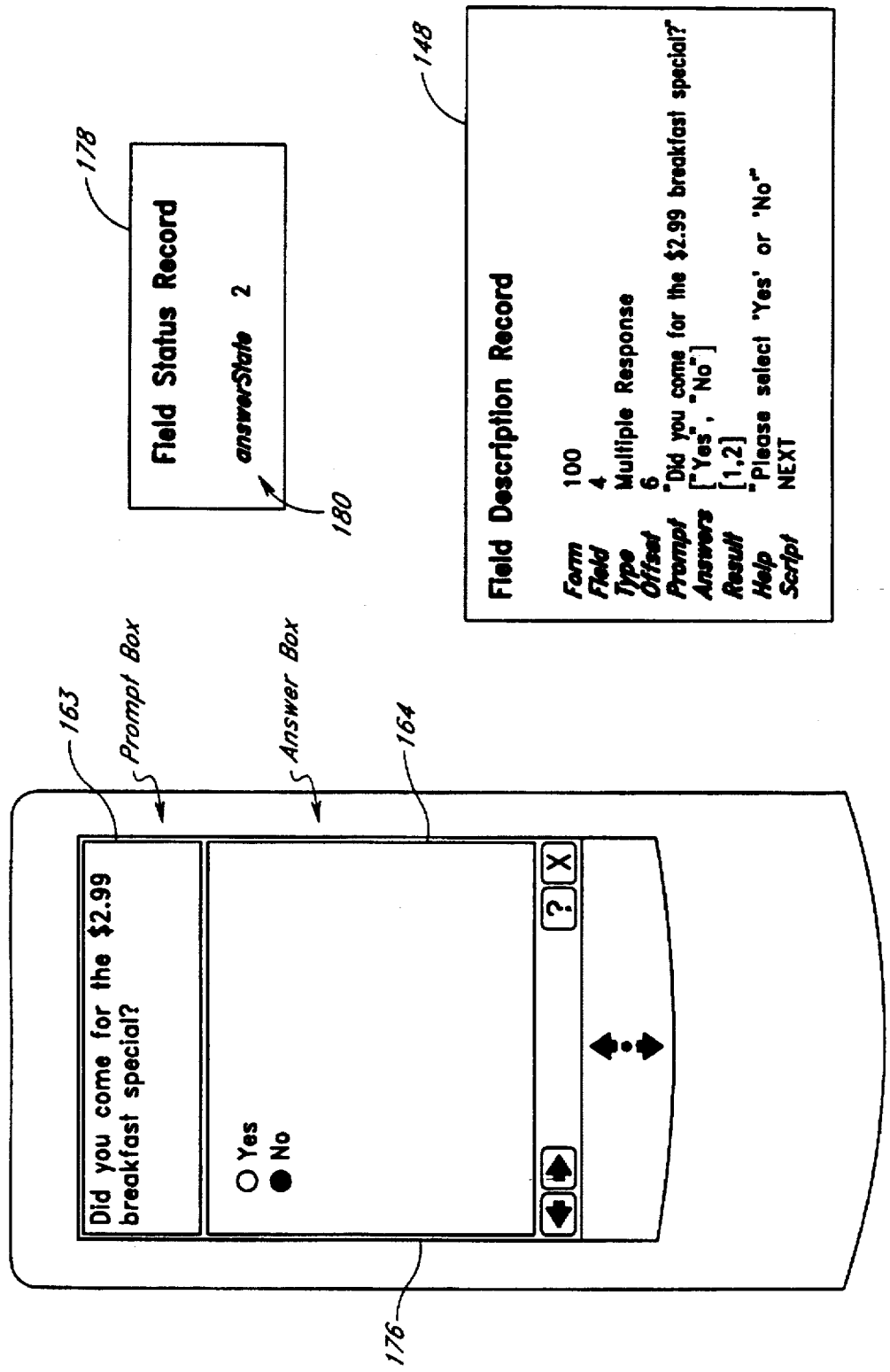
FIG. 5 is a diagram of an exemplary screen display as presented on the display of the handheld computer for the field 4 data structure, and the associated field description record and a field status record of the exemplary form of FIG. 2.

If the forms engine 124 determines at decision state 404 that the field type of the current FDR is not "multiple response", the forms engine advances to a decision state 430 to determine if the field type is "multiple dichotomy". If so, the forms engine 124 proceeds to state 410, wherein check boxes are drawn on the answer box portion 164 of the display screen of the PDA as seen in the example of FIG. 4. State 410 and the remaining states of the flow for multiple dichotomy are the same as for multiple response discussed above. A field status record 168 utilizes an answerState field 170 that contains an array with as many elements as offsets defined in the corresponding FDR 146. All the elements of the array are initially set to NIL. When a checkbox is selected by the user, the value of the position in the array corresponding to the selected checkbox toggles from NIL to one (1), if the box was initially blank, or from 1 to NIL, if the checkbox was already checked. Thus, in the example of FIG. 4, the first and second of three checkboxes is shown to be checked, so the answerState array is [1, 1, NIL].

If the forms engine 124 determines at decision state 430 that the field type of the current FDR is not "multiple dichotomy", the forms engine advances to a decision state 440 to determine if the field type is "text". If so, the forms engine 124 proceeds to state 442 and draws three lines at the top of answer box portion 164 of the display screen 106 for the user to write on with the stylus. Moving to state 444, the forms engine 124 draws a QWERTY-style keyboard image in the bottom part of the answer box. Moving to state 446, the forms engine 124 checks the form data array to see if an answer has already been stored for this field (storing operation done at state 352, FIG. 8) at a decision state 448. If the field has already been answered, the forms engine 124 moves to state 450 and draws the value or characters stored in the form data array on the lines (text) or line (numeric) previously drawn (states 442 or 462) on the screen 106. If the field is not already filled in, as determined at state 448, or after completion of state 450, the forms engine 124 moves to state 428 and returns to the forms engine function (FIG. 8).

If the forms engine 124 determines at decision state 440 that the field type of the current FDR is not "text", the forms engine 124 advances to a decision state 460 to determine if the field type is "numeric" If so, the forms engine 124 proceeds to state 462 and draws one line at the top of answer box portion 164 of the display screen 106 for the user to write on with the stylus. Moving to state 464, the forms engine 124 draws a numeric keypad image in the bottom part of the answer box. Moving to state 446, the forms engine 124 checks the form data array to see if an answer has already been stored for this field. The remaining states for the numeric field type, states 448, 450, and 428, have been described above. An example of a numeric type field is shown in the example of FIG. 3.

If the forms engine 124 determines at decision state 460 that the field type of the current FDR is not "numeric", the forms engine 124 proceeds through off-page connector B 468 to a decision state 470 on FIG. 9b to determine if the field type is "matrix". If so, the forms engine 124 proceeds to state 472 and generates a row of bubbles on the screen 106 with associated text from the answer field of the current FDR, with as many bubbles as there are values in the result array of the FDR. This operation is repeated for as many rows as there are offsets defined in the offset array of the current FDR. For example, the FDR 150 for the example matrix field shown in FIG. 6 has five values in the "result" field and has five offsets defined in the "offset" field. Thus, a 5×5 matrix is drawn in the answer box portion 164 of the example screen display 184. Moving to state 473, the forms engine 124 draws column headings in 473 based on the range array in the current FDR.

Figure 6:
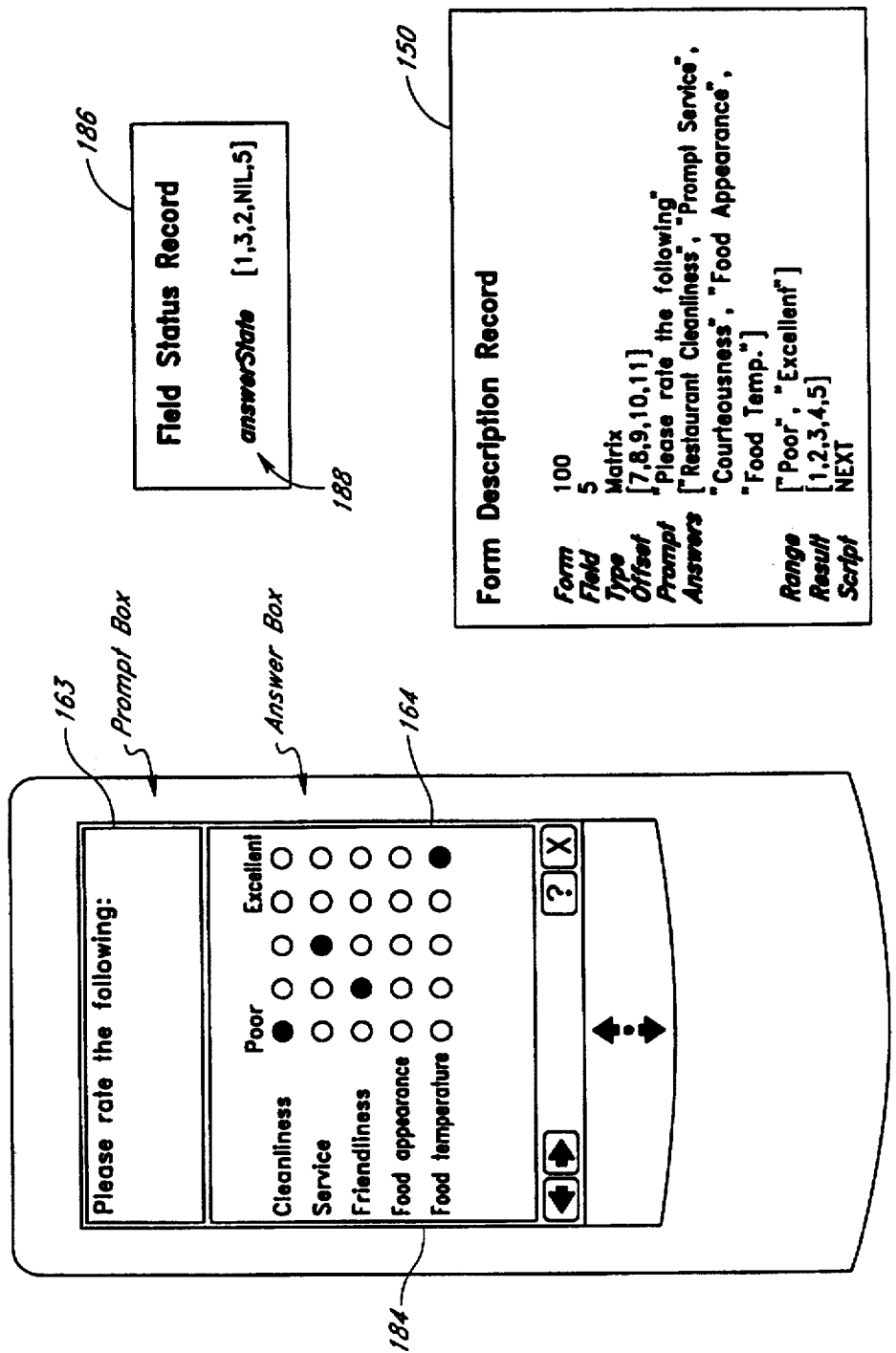
FIG. 6 is a diagram of an exemplary screen display as presented on the display of the handheld computer for the field 5 data structure, and the associated field description record and a field status record of the exemplary form of FIG. 2.

Proceeding to a decision state 474, the forms engine 124 determines if a field status record 186 exists for the current field. If not, the forms engine advances to a "create field status record" function 476 to generate the record. The record 186 utilizes an answerState array 188 that is a one by "n" array with as many elements "n" as there are offsets defined in the FDR for the current field. Each element of the array is initially set to NIL. In the example of FIG. 6, five offsets, corresponding to the five rows in the matrix, are defined in the FDR 150. The first (top) row corresponds with the first element of the array, and so forth. If a bubble is selected in a particular row, the column number of the selected bubble (left-most column number is one) is used as the value of the element in the answerState array. A matrix row without a selected bubble has the corresponding element in the answerState array as NIL.

If the field status record was determined to exist at state 474, or at the completion of "create field status record" function 476, the forms engine 124 proceeds to a loop of states 478, 480, 482 to mark any previously selected bubbles for the displayed field. At state 478, for each row of bubbles visible in the answer box portion 164 of the display screen, the forms engine 124 determines at a decision state 480 if a mark is to be placed in the designated bubble at state 482. At decision state 480, the forms engine uses the answerState array of the field status record to determine if the element of the array at index [bubblerow] is not NIL. If true, at state 482, the forms engine 124 marks the bubble in the current row of the matrix at the bubble column identified by the value stored at index [bubblerow] in the answerState array. If decision state 480 evaluates to false (the element at index [bubblerow] is NIL), the forms engine 124 accesses the next row of bubbles at state 478. The loop 478–482 continues until all visible bubble rows have been evaluated, at which time the forms engine 124 moves to state 484 and returns to the forms engine function (FIG. 8).

If the forms engine 124 determines at decision state 470 that the field type of the current FDR is not "matrix", the forms engine advances to a decision state 490 to determine if the field type is "counter". If so, the forms engine 124 proceeds to state 492 and draws a button at the top of answer box portion 164 of the display screen 106. This button contains a number used as a counter, such that every time the button is selected, the number is incremented by one. In another embodiment of the invention, the counter can be initialized to begin at a selected number, such as zero or one, and count up, or be initialized to a different number, such as 100, and count down to yet another selected number. In another embodiment of the invention, the forms engine 124 draws a timer on the display, in addition to the counter. The timer can be set to begin at zero and time a predetermined time interval, or begin at a selected amount of time, such as an hour, and notify the user after the hour has expired by an alarm or sound, such as a "beep" sound. Various other counter and timer combinations are contemplated.

Moving to state 494, the forms engine 124 checks the form data array at the offset corresponding to the current "counter" field to see if the field already has a value stored at a decision state 496. If the field does not already have a value stored, the forms engine 124 moves to a state 498 and draws the stored value on the button drawn at state 492. If either the field does have a value stored in the form data array, as determined at state 496, if the field type is not "counter", as determined at state 490, or at the completion of drawing the value at state 498, the forms engine 124 moves to state 484 and returns to the forms engine function (FIG. 8).

VI. ANSWER BOX INPUT

Figure 10A:
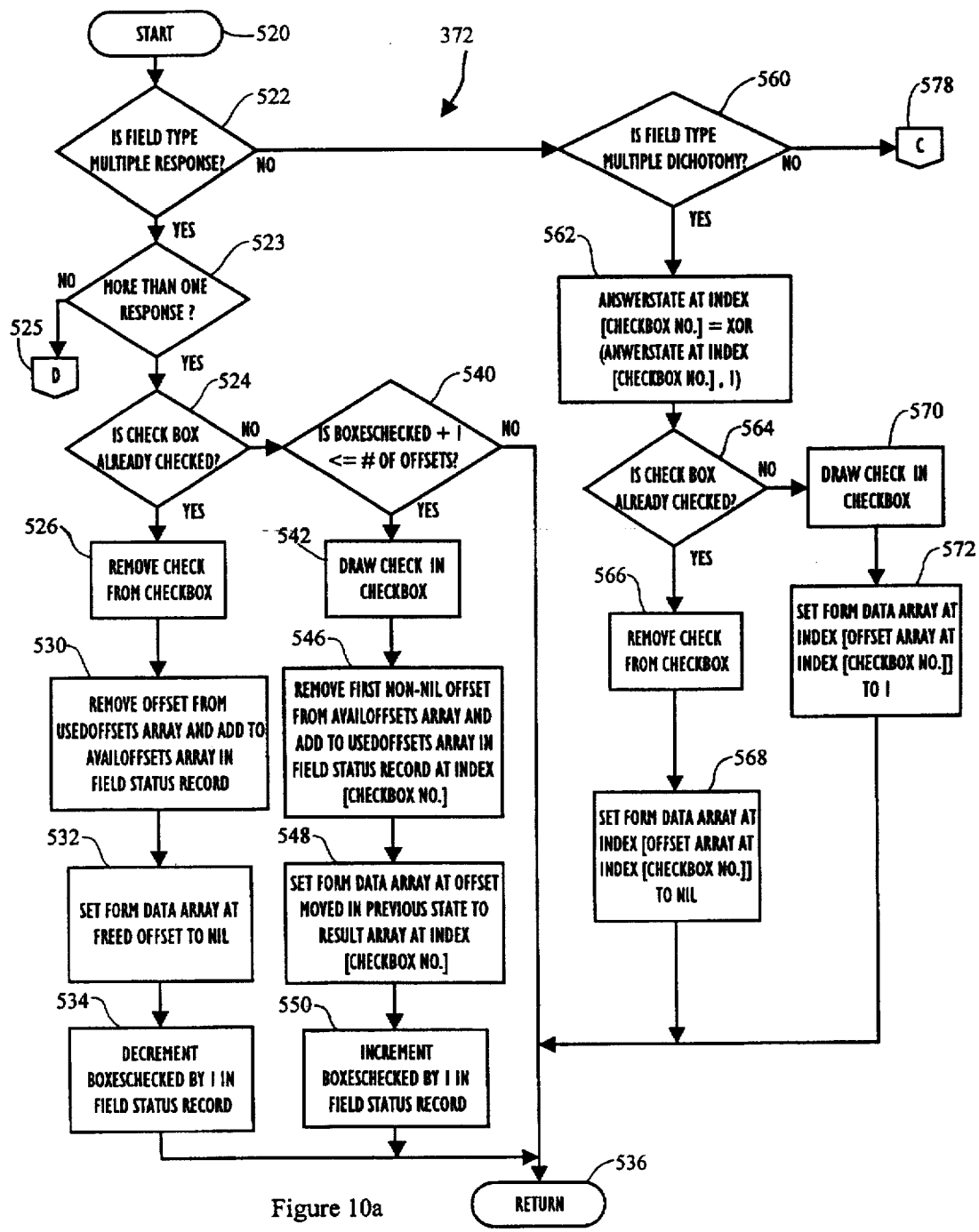
FIGS. 10a, 10b and 10c are a flow diagram of the "Process answer box input" function 372 presented in FIG. 8.
Figure 10B:
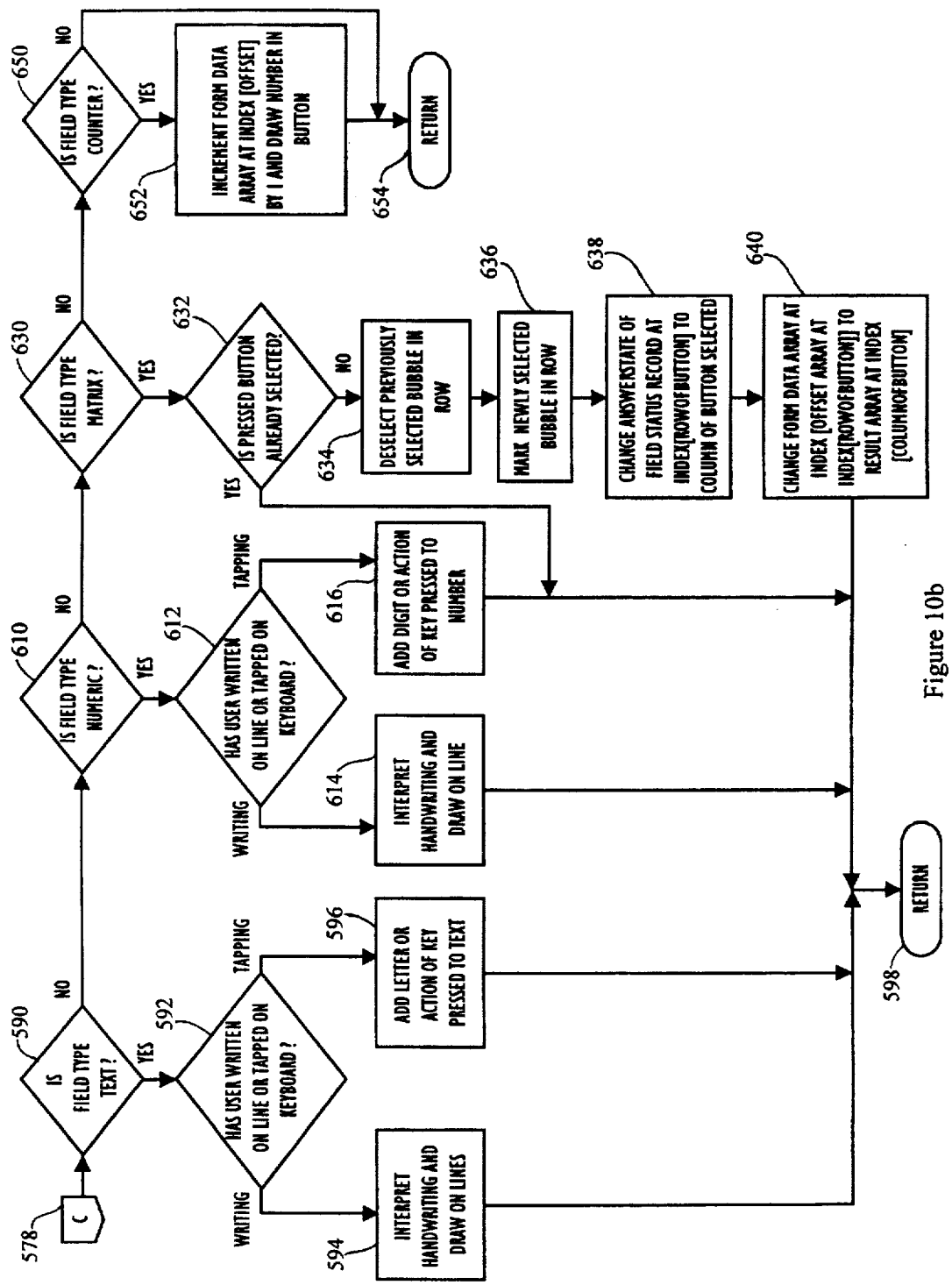
Figure 10C:
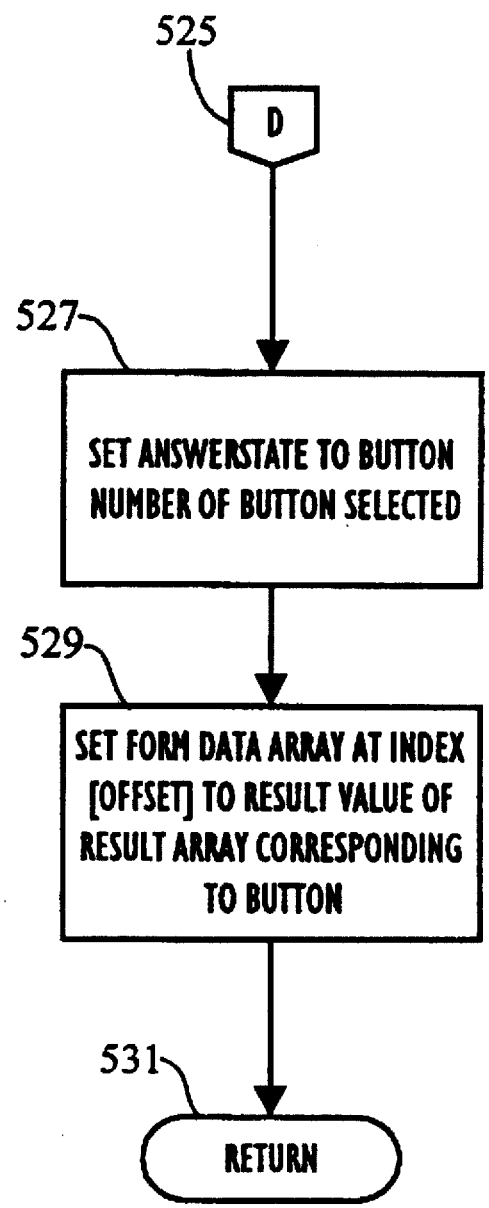

Referring now to FIGS. 10a, 10b and 10c, the "answer box input" function 372 will be described. After a selected field has been drawn on the screen 106 of the PDA 104, the user of the electronic form responds to the prompt located in the prompt portion 163 of the display. Answer box input function 372 responds to the user's selections and performs the operations necessary to display the selections and update the form data array for the current field and the field status record (if necessary).

Beginning at a start state 520, the forms engine proceeds to a decision state 522 to determine if the current field displayed has a field type of "multiple response." If so, the forms engine 124 moves to a decision state 523 to determine if more than one response is allowed, i.e., is more than one offset defined in the current FDR. If only one offset is defined for this field, the forms engine 124 proceeds through off-page connector D 525 to state 527 on FIG. 10c. At state 527, the forms engine 124 sets answerState array, which in the case of a single response is a single element, to the button number of the button selected. The button numbers begin with one, beginning at the top of the display. Moving to state 529, the forms engine 124 sets the form data array indexed by the offset defined in the FDR to the result value in the FDR result array corresponding to the selected button. In the example shown in FIG. 5, the second button is selected, so the value (i.e., two) of second element in the result array is written to the form data array at offset 6. Upon completion of state 529, the forms engine 124 moves to state 531 and returns to the forms engine function (FIG. 8).

Returning attention now to decision state 523 on FIG. 10a, if more than one offset is defined by the current FDR, the forms engine 124 advances to a decision state 524 to determine if the checkbox selected by the user is already checked. If so, the forms engine 124 moves to state 526 and removes or deletes the check from the checkbox on the screen display. The following three states, 530, 532, 534, revise the field status array record and form data array for this field. At state 530, the forms engine 124 removes the offset associated with the current checkbox from the used-Offsets array and adds the offset to the availOffsets array in the field status record. Proceeding to state 532, the forms engine 124 sets the form data array at the offset freed up at state 530 to NIL. Then at state 534, the forms engine 124 decrements the boxesChecked field in the field status record by one. Upon completion of state 534, the forms engine 124 moves to state 536 and returns to the forms engine function (FIG. 8).

Returning attention now to decision state 524, if the checkbox selected by the user is not already checked, the forms engine 124 moves to a decision state 540. At decision state 540, the forms engine 124 determines if the value of the boxesChecked field of the field status record plus one is less than or equal to the number of offsets defined in the FDR for the current field. If so, the forms engine 124 proceeds to state 542 and draws a check on the screen display in the checkbox selected by the user. The following three states, 546, 548, 550, revise the field status array record and form data array for this field. At state 546, the forms engine 124 removes the first non-nil element from the availOffsets array and adds the offset to the usedOffsets array at the index [checkbox number] in the field status record. Proceeding to state 548, the forms engine 124 sets the form data array at the new offset, added to usedOffsets at state 546, to the value of the result array of the FDR at index checkbox number. Moving to state 550, the forms engine 124 increments the boxesChecked field in the field status record by one. Upon completion of state 550, the forms engine 124 moves to state 536 and returns to the forms engine function (FIG. 8).

Returning attention now to decision state 522, if the field type is not "multiple response", the forms engine 124 advances to a decision state 560 and determines if the field type is "multiple dichotomy". If so, the forms engine 124 proceeds to state 562 and writes the answerState field at index [checkbox number] in the field status record for the current field to the result of the Boolean exclusive-OR of the value presently at answerState[checkbox number] with one. In essence, this operation toggles the value of the checkbox selected by the user in the answerState array. Moving to a decision state 564, the forms engine 124 determines if the checkbox selected by the user is already marked as checked. If so, the forms engine 124 moves to state 566 and removes or deletes the check from the selected checkbox, i.e., if the user selects a checkbox that is already marked, the mark is cleared from the checkbox. Proceeding to state 568, the forms engine 124 sets the form data array at index [offset array in the FDR of the current field which is indexed by [checkbox number]] to NIL. For example, referring to FIG. 4, the offset array field in the FDR 146 for the current field is [3,4,5]. If checkbox number two (the second from the top) is selected by the user, the second element in the offset array is indexed, yielding the value four (4). Thus, offset four in the form data array would be set to NIL (since the checkbox was previously checked, as shown in FIG. 4). Upon completion of state 568, the forms engine 124 moves to state 536 and returns to the forms engine function (FIG. 8).

If the checkbox selected by the user is not already checked, as determined at decision state 564, the forms engine 124 proceeds to state 570 and draws a check in the selected checkbox. Moving to state 572, the forms engine 124 sets the form data array at index [offset array in the FDR which is indexed by [checkbox number]] to one. Upon completion of state 572, the forms engine 124 moves to state 536 and returns to the forms engine function (FIG. 8).

Returning attention now to decision state 560, if the field type is not "multiple dichotomy", the forms engine 124 proceeds through off-page connector C 578 to a decision state 590 on FIG. 10b and determines if the filed type is "text". If so, the forms engine 124 proceeds to state 592 and determines if the user has written on the lines displayed on the screen 106 of the PDA 104 or has tapped on the keyboard image displayed on the screen. The user can use either the keyboard image to pick the desired characters to be "typed" on the three lines or the stylus to write the desired characters on the lines. If the characters are written, as determined at state 592, the PDA 104 utilizes an internal built-in recognition function to interpret the handwriting and display the handwriting on the lines.

If the user has tapped on the keyboard image, as determined at state 592, the forms engine 124 either inserts the letter pressed at the insertion point to the text string or performs the action, e.g., move forward, move backward, delete. For example, a particular field may be looking for a single letter, such as "c" as an answer or may alternately build up a word or sequence of words (a single letter at a time if using the keyboard or a word at a time if writing) in the text string. If a displayable character was tapped by the user, the character is displayed on the lines of the PDA screen 106. Upon completion of state 596, the forms engine 124 moves to state 598 and returns to the forms engine function (FIG. 8).

Returning attention now to decision state 590, if the field type is not "text", the forms engine 124 proceeds to a decision state 610 and determines if the field type is "numeric". If so, the forms engine 124 proceeds to state 612 and executes states 612 and 614 or 612 and 616 in a manner similar to states 592–596 for the field type "text". The differences are that only one line is shown on the PDA screen 106 for a numeric field type, and a number is built up one digit at a time (or the answer could be a single digit) instead of building a text string.

Returning attention now to decision state 610, if the field type is not "numeric", the forms engine 124 proceeds to a decision state 630 and determines if the field type is "matrix". If so, the forms engine 124 proceeds to state 632 and determines if the button selected by the user is already marked or selected. If so, no further action is performed on the row in the matrix that has the selected button. The forms engine 124 moves to state 598 and returns to the forms engine function (FIG. 8).

If the button pressed by the user is not already marked as selected, as determined at decision state 632, the forms engine 124 proceeds to state 634 and removes or deletes the mark from the previously selected bubble in the same row as the mark currently selected by the user. Moving to state 636, the forms engine 124 draws a mark in the newly selected bubble in the row. Proceeding to state 638, the forms engine 124 changes the answerState field of the field status record for the current field at index [Row of Button] to the column number (column one is left-most on the display) of the newly selected bubble. Then, at state 640, the forms engine 124 changes the form data array indexed at the offset array field (in the FDR for the current field) that is indexed by the Row of Button to the value of the result stored in result field of the current FDR indexed by the Column of Button. The Row of Button is the row in the matrix of the button newly selected by the user.

For example, referring to FIG. 6, the offset array field in the FDR 150 is [7,8,9,10,11]. If the user just selected the last (fifth) bubble in the fifth row, the Row of Bubble is 5. Therefore, the fifth position in the offset array field is indexed by Row of Bubble to yield offset 11 (eleven). This offset eleven then is used to index the form data array at index eleven, which is changed to the value stored in the result array at index Column of Button, which in our example is 5. At the completion of state 640, the forms engine 124 moves to state 598 and returns to the forms engine function (FIG. 8).

Returning attention now to decision state 630, if the field type is not "matrix", the forms engine 124 proceeds to a decision state 650 and determines if the field type is "counter". If so, the forms engine 124 proceeds to state 652 and increments the element located in the form data array indexed at the offset in the FDR for this field by one and then draws this number in the button displayed on the PDA screen 106. In other words, the counter value is incremented by one, and the value is stored in the form data array at the offset for this field and also displayed on the PDA screen. At the completion of state 652, or if the field type is not "counter", as determined at state 650, the forms engine 124 moves to state 654 and returns to the forms engine function (FIG. 8).

VII. EXECUTE SCRIPT

The "execute script" function 354 will now be described. The execute script function 354 is called by the forms engine 124 (FIG. 8) either as a result of determining that the field type of the current field is "script" (state 314), or after the Next button is pushed (state 350) and the field data for the current field is saved in the form data array (state 352). In either case, the script field of the FDR for the current field is executed by the function 354. The script field contains a script or small program written in a scripting language supporting flow of control statements, such as IF/THEN/ELSE, and over 100 functions. The script may be as short as a single statement, or contain an entire procedure. A script can provide functions for the electronic form such as data validation, field navigation, context sensitive help, data formatting, alert sounds, and dialog boxes. Data validation may be performed with respect to any information available to the forms engine, which includes information derived from the functions defined in the scripting language, the forms data array, and information available from the PDA operating system. An example of data that can be incorporated into a validation statement is the current date. The current date could be compared to a date provided by the user, and the user input could be accepted or rejected based on the comparison.

The execute script function utilizes the grammar rules provided in Table 3:

TABLE 3

| Script Language Grammar Rules - Backus Naur Form (BNF) |
|---|
| The rules presented here are defined with the following conventions: |
| nonterminal |
| TERMINAL |
| [ optional ] |
| { one | two | three } any of these choices |
| [ zero or more] * |
| [one or more ]+ |
| < description >   This is a description of what is allowed |
| GRAMMAR RULES |

TABLE 3-continued

Script Language Grammar Rules - Backus Naur Form (BNF)

```
input
      statement-list
statement-list
      statement-list statement
statement
      { function I if-expression I for-expression I while-expression I
      variable-declaration }
function
      name ( [ parameter-list ] )
parameter-list
      { parameter I parameter , parameter-list }
parameter
      { string I expression }
if-expression
      IF boolean-expression THEN statement-list [ELSE statement-list]
      ENDIF
for-expression
      FOR name GETS expression TO expression ENDFOR
while-expression
      WHILE boolean-expression DO statement-list ENDWHILE
variable-declaration
      { VAR name I VAR name GETS expression }
boolean-expression
      { boolean-function
      I expression  boolean-operator  expression
      I boolean-expression  AND  boolean-expression
      I boolean-expression  OR  boolean-expression
      I NOT boolean-expression
      I expression }
boolean-operator
      { = I <> I > I < I >= I <= }
expression
      { expression operator expression
      I function
      I number
      I realnumber
      I OFFSET number
      I OFFSET ( expression ) }
operator
      { + I - I * I DIV I MOD I & }
name
      [character ]+
number
      [ - ] [ digit ]+
realnumber
      [ - ] [ digit ]+ · [ digit ]* [{ e I E } [ - ] [digit ]+ ]
digit
      { 0 I 1 I 2 I 3 I 4 I 5 I 6 I 7 I 8 I 9 }
string
      " character-sequence "
character-sequence
      [{string-character I escape-sequence}]*
string-character
      < any ascii character code 32-127 except " or \ >
escape-sequence
      { \ { " I \ I n I t }
character
      < A to Z and a-z >
```

Figure 11:
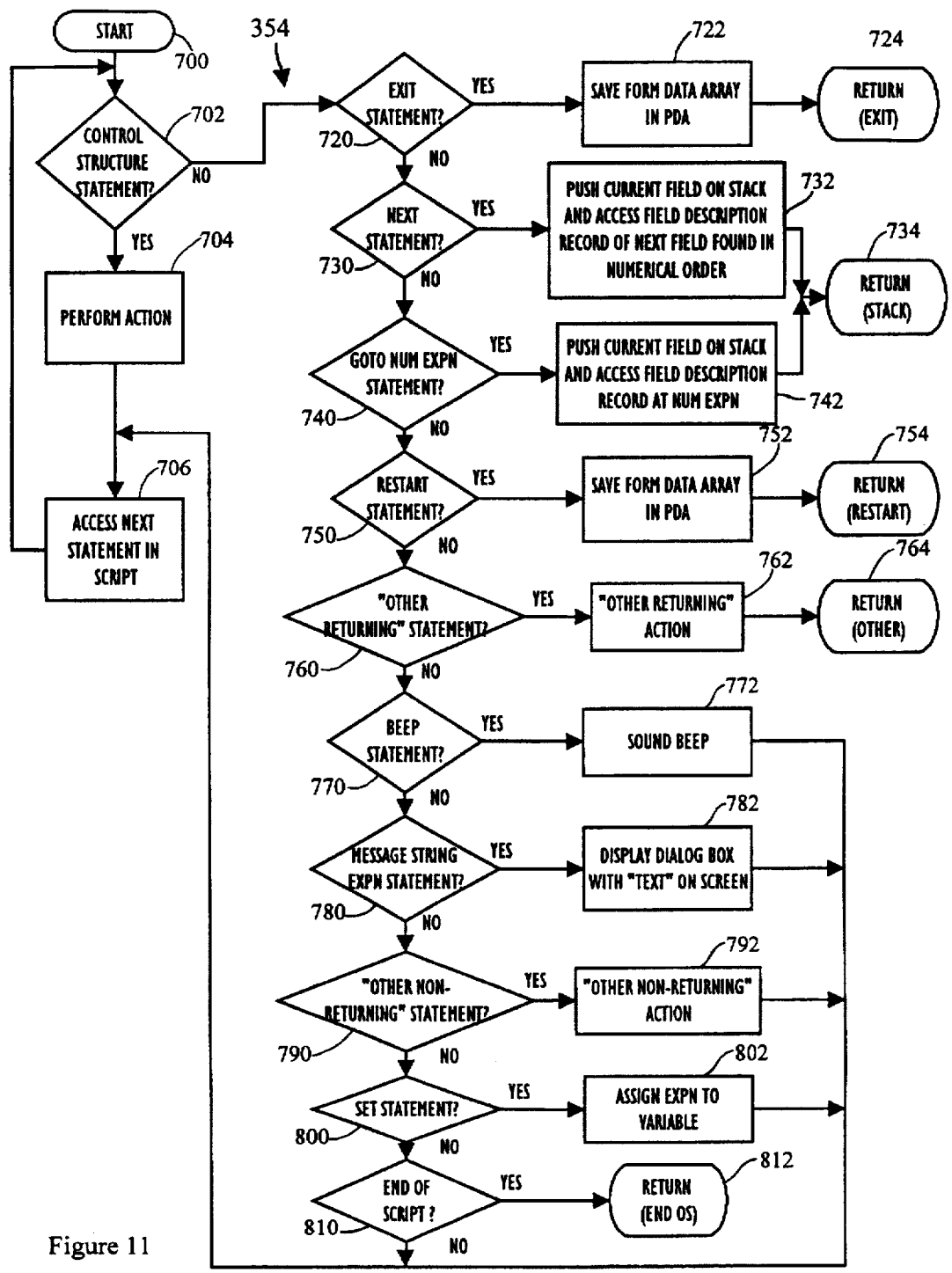
FIG. 11 is a flow diagram of the "execute script" function 354 presented in FIG. 8.

Referring now to FIG. 11, portions of the execute script function 354 relevant to the forms engine 124 are presented in a flowchart format. The execute script function 354 begins at a start state 700, accesses the first statement in the script, and proceeds to a decision state 702 to determine if the statement is part of a control structure, e.g., IF/THEN/ELSE. If so, the forms engine 124 performs the action necessary to implement the control structure at state 704, and advances to state 706 to access the next statement in the script file based on the action of any control structure that may be active, e.g., loop, IF/THEN. The forms engine 124 then loops back to state 702 to evaluate the new statement in the script.

If the statement is not part of a control structure, as determined at decision state 702, the forms engine 124 proceeds to decision states 720-810 to check the statements in the script by type. At decision state 720, the forms engine 124 determines if the statement is an EXIT statement. If so, the forms engine 124 advances to state 722 and permanently saves the form data array in the PDA 104. After the data is saved at state 722, the forms engine 124 moves to state 724 wherein an "exit" flag is set and a return is performed to the forms engine function (FIG. 8). The exit flag denotes that the EXIT statement was performed by the execute script function 354.

If the current statement is not an EXIT statement as determined at decision state 720, the forms engine 124 proceeds to a decision state 730 to determine if the statement is a NEXT statement. If so, the forms engine 124 advances to state 732, pushes the current field number on the stack (created at state 306, FIG. 8), and accesses the FDR of the next field in numerical order, i.e., moves to the next field of the electronic form. After the stack push and next field access at state 732, the forms engine 124 moves to state 734 wherein a "stack" flag is set and a return is performed to the forms engine function (FIG. 8). The stack flag denotes that a navigation-type statement was performed by the execute script function 354.

If the current statement is not a NEXT statement as determined at decision state 730, the forms engine 124 proceeds to a decision state 740 to determine if the statement is a GOTO (numeric expression) statement. If so, the forms engine 124 advances to state 742, pushes the current field number on the stack, and accesses the FDR of the field number provided or determined by the statement, i.e., skips or jumps to the field of the electronic form pointed to by the numeric expression in the GOTO statement. After the stack push and next skip field access at state 742, the forms engine 124 moves to state 734 wherein the "stack" flag is set and a return is performed to the forms engine function (FIG. 8).

If the current statement is not a GOTO (numerical expression) statement as determined at decision state 740, the forms engine 124 proceeds to a decision state 750 to determine if the statement is a RESTART statement. If so, the forms engine 124 advances to state 752 and permanently saves the form data array in the PDA 104 (as performed at state 722). After the data is saved at state 752, the forms engine 124 moves to state 754 wherein a "restart" flag is set and a return is performed to the forms engine function (FIG. 8). The restart flag denotes that the RESTART statement was performed by the execute script function 354.

If the current statement is not a RESTART statement as determined at decision state 750, the forms engine 124 proceeds to a decision state 760 to determine if the statement is an "other returning" statement. "Other returning" statements designates other statements not listed in the flowchart of FIG. 11 that are processed by the execute script function and optionally perform some action, including communication based actions, and return to the forms engine function. If state 760 is true, the forms engine 124 advances to state 762 and optionally performs the action corresponding to the "other returning" statement, if an action is required. After the optional action at state 762, the forms engine 124 moves to state 764 wherein a optional flag, shown as "other", is set and a return is performed to the forms engine function (FIG. 8). Thus, a generic returning function has been described.

If the current statement is not an "other returning" statement as determined at decision state 760, the forms engine 124 proceeds to a decision state 770 to determine if the statement is a BEEP statement. If so, the forms engine 124 advances to state 772 and initiates a beep sound that is produced by the PDA 104. Of course, other sounds can be readily produced in other embodiments. After the beep sound is produced at state 772, the forms engine 124 proceeds to state 706 wherein the next statement in the script file is accessed, as previously described.

If the current statement is not a BEEP statement as determined at decision state 770, the forms engine 124 proceeds to a decision state 780 to determine if the statement is a MESSAGE (STRING EXPN) statement. If so, the forms engine 124 advances to state 782 and displays a dialog box with the "STRING" message on the PDA screen 106. The forms engine 124 then proceeds to state 706 wherein the next statement in the script is accessed.

If the current statement is not a MESSAGE (STRING EXPN) statement as determined at decision state 780, the forms engine 124 proceeds to a decision state 790 to determine if the statement is an "other non-returning" statement. "Other non-returning" statement designates other functions not listed in the flowchart of FIG. 11 that are processed by the execute script function and perform an action but do not return to the forms engine function. If state 790 is true, the forms engine 124 advances to state 792 and performs the action corresponding to the "other non-returning" function. The forms engine 124 then proceeds to state 706 wherein the next statement in the script file is accessed.

If the current statement is not an "other non-returning" statement, as determined at decision state 790, the forms engine 124 proceeds to a decision state 800 to determine if the statement is a SET statement, in the format SET [VARIABLE]TO [EXPN], e.g., SET data[3] TO 5 or SET data[10]TO 12+min(data[1],data[2]). If so, the forms engine 124 proceeds to state 802 and assigns the right-hand side of the SET statement, i.e., the expression (EXPN) after the word "TO", to the variable after the word "SET." Moving to state 706, the forms engine 124 accesses the next statement in the script file, as described above.

If the current statement is not a SET statement as determined at decision state 800, the forms engine 124 proceeds to a decision state 810 to determine if the end of the script is reached. If so, the forms engine 124 moves to state 812 wherein an "end" (of script) flag is set and a return is performed to the forms engine function (FIG. 8). The end flag denotes that the end of the script was reached by the execute script function 354. Upon return to the forms engine function, the forms engine 124 evaluates the flags and then waits for user input. If the end of the script has not been reached, as determined at decision state 810, the forms engine 124 proceeds to state 706 wherein the next statement in the script is accessed.

VIII. BENEFITS OF THE FORMS SYSTEM

Complex forms, such as questionnaires, can be created quickly and easily. Part of the forms system 100 includes the forms creation program that runs on a Macintosh or Windows based PC. This application allows the user to create a form for use with the Newton PDA 104 (FIG. 1). To create a form, the form designer simply points and clicks to define a number of fields of different types. For each field, the designer specifies certain attributes such as the field type, a question or prompt, a list of answer choices, a help message, a control script, and others. All attributes are defined with visual editors providing maximal ease of use. This information is then easily transferred to the Newton via serial cable. After data has been collected by filling out the form with the Newton, the data is transferred from the Newton back to the host PC where it is available for use with common data analysis programs.

No paper forms are needed. At no time in the data collection process is paper used. From the time the form is designed to the time data is collected, both the form and data exist only in digital format. This eliminates the high cost of form duplication and also eliminates labor and equipment costs associated with scanning forms using OMR or OCR. The elimination of paper forms also rids the data collection process of expensive manual data entry that was previously needed to transfer data from paper forms to a computer.

Designers can create intelligent forms that cannot be completed incorrectly. Field scripts allow form designers to implement data validation, skip patterns, data formatting, alert sounds, dialog boxes, and communications abilities. Scripts are responsible for actually walking the user through the entire form and providing interactive feedback. This technique brings to data collection a level of ease and accuracy previously unattainable in the industry.

As improvements are made in PDA technology, the flexibility of the forms system 100 will allow it to take advantage of new features. For example, as handwriting recognition improves, open ended questions can be answered more easily by allowing users to write text directly on the screen rather than using on-screen keyboards. Further improvements in wireless technology will also allow the forms system 100 to improve the speed at which data can be collected and analyzed.

IX. OPTIONAL SYSTEM CONFIGURATION

In yet other embodiments, other structures, arrays, portable computers, operating systems or algorithms can be used. The general system, method and procedures would remain the same. For example, field types will be added allowing forms to collect information using external peripheral devices such as bar code readers, digital cameras, and microphones. With these additions, forms could be created that are capable of collecting visual and audible data, something never possible with paper forms.

The forms system 100 described herein finds application in many environments, and is readily adaptable for use therein. The system finds use in any application in which data is collected procedurally or algorithmically. For example, the system could be used to automate a personality profile based on a line of questioning. After answering a series of questions, the user would be provided with results calculated from the answers he gave. The system would also find application in a product order entry environment. Product order forms could be filled out using the PDA and then sent directly to a vendor where they would be automatically processed because they arrived in digital format. The system would also find use automating quality control checklists common on manufacturing floors.

X. SUMMARY OF THE ADVANTAGES OF THE PRESENT INVENTION

Eliminates paper forms from a previously paper intensive process;

Eliminates need for expensive scanners used to process paper forms;

Eliminates labor expense by eliminating manual data entry, form coding, and form scanning;

Significantly reduces form creation and modification cost by eliminating layout necessary for paper forms;

Allows form designers to create intelligent forms that can eliminate the opportunity for errors common in previous methods;

Data collectors are 'walked' through forms and can get help at any time, thus reducing training time and improving accuracy;

Data can be collected, compiled, and analyzed in an extremely short span of time and with a level of ease and accuracy not previously attainable.

While the above detailed description has shown, described, and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A system for completing an electronic form, comprising:

a portable unit including a processor, a graphics display, an input device mechanism and a memory;

an electronic form stored in the memory of the unit comprising a plurality of form descriptors that define displayable items, wherein each form descriptor includes a self-contained script program indicative of the next displayable item to be displayed, wherein each script program stores and retrieves data to and from the memory and wherein the order of display of the displayable items is defined by the script programs;

a forms engine to display a single displayable item on the graphics display described by one of the form descriptors, wherein the displayable item includes a sentence and a set of possible response entries, wherein the script program of the displayable item is interpreted by the forms engine, and wherein the one displayable item utilizes the entire display; and wherein the input device mechanism accepts one or more of the responses selected by a user of the unit.

2. The system defined in claim 1, wherein the input mechanism comprises:

a stylus;

a screen responsive to contact with the stylus and providing signals indicative to each contact; and software in communication with the screen for responding to each contact of the screen.

3. The system defined in claim 1, wherein the forms engine is capable of receiving signals from an external peripheral device.

4. The system defined in claim 3, wherein the peripheral device includes one of the following: barcode reader, digital camera, and microphone.

5. The system defined in claim 1, wherein the form descriptor includes a type field.

6. The system defined in claim 5, wherein one of the field types is script.

7. The system defined in claim 6, wherein the initial initiates an action.

8. The system defined in claim 7, wherein the action includes a calculation.

9. The system defined in claim 7, wherein the action initiates a communication function.

10. The system defined in claim 9, wherein the communication function includes a communications device.

11. The system defined in claim 10, wherein the communications device comprises a modem.

12. The system defined in claim 10, wherein the communication device comprises a point-to-point communication link.

13. The system defined in claim 10, wherein the communication device comprises a wireless device.

14. The system defined in claim 1, wherein the displayable item requires an answer box input by the user.

15. The system defined in claim 14, wherein the answer box input is indicative of one of a plurality of types.

16. The system defined in claim 15, wherein one answer box input type includes a counter function.

17. The system defined in claim 16, wherein the counter function displays a button and a number on the graphics display, and wherein the number is changed when the button is selected by the user.

18. The system defined in claim 17, wherein the number is initialized to a predetermined value.

19. The system defined in claim 17, wherein the number is incremented when the button is selected by the user.

20. The system defined in claim 17, wherein the number is decremented when the button is selected by the user.

21. The system defined in claim 1, wherein the displayable item includes a next button.

22. The system defined in claim 21, wherein selection of the next button initiates evaluation of an expression to validate the response by the user.

23. The system defined in claim 22, wherein a successful evaluation of the expression to validate the response initiates an evaluation of an expression to determine the next form descriptor.

* * * * *

UNITED STATES PATENT AND TRADEMARK OFFICE
CERTIFICATE OF CORRECTION

PATENT NO.   : 5,704,029
DATED        : December 30, 1997
INVENTOR(S)  : Gerald V. Wright It is certified that error appears in the above-identified patent and that said Letters Patent is hereby corrected as shown below:

<u>Column 30,</u>
Line 5, please change "initial" to -- script --.

Signed and Sealed this

Fifteenth Day of October, 2002

*Attest:*

*Attesting Officer*

JAMES E. ROGAN
*Director of the United States Patent and Trademark Office*